US012579790B2

(12) United States Patent
Li et al.

(10) Patent No.: US 12,579,790 B2
(45) Date of Patent: Mar. 17, 2026

(54) MODEL TRAINING METHOD, IMAGE RETRIEVAL METHOD, AND APPARATUS

(71) Applicant: HUAWEI TECHNOLOGIES CO., LTD., Shenzhen (CN)

(72) Inventors: Weimian Li, Shenzhen (CN); Kaiqiang Zhu, Shenzhen (CN); Fei Huang, Shenzhen (CN); Songcen Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 298 days.

(21) Appl. No.: 18/361,011

(22) Filed: Jul. 28, 2023

(65) Prior Publication Data

US 2023/0368505 A1     Nov. 16, 2023

Related U.S. Application Data

(63) Continuation of application No. PCT/CN2022/073923, filed on Jan. 26, 2022.

(30) Foreign Application Priority Data

Jan. 30, 2021     (CN) .......................... 202110132038.4

(51) Int. Cl.
    *G06V 10/774*      (2022.01)
    *G06F 40/289*    (2020.01)
    (Continued)

(52) U.S. Cl.
    CPC .......... *G06V 10/774* (2022.01); *G06F 40/289* (2020.01); *G06T 3/02* (2024.01);
    (Continued)

(58) Field of Classification Search
    CPC ...... G06V 10/774; G06V 10/26; G06V 10/40; G06V 10/761; G06V 10/762;
    (Continued)

(56) References Cited

U.S. PATENT DOCUMENTS 10,672,129 B1 *  6/2020  Yoo ........................ G06N 3/045
2020/0160177 A1  5/2020  Durand et al.
(Continued)

FOREIGN PATENT DOCUMENTS

CN      104298749 A    1/2015
CN      106326288 A    1/2017
(Continued)

OTHER PUBLICATIONS

Yanhao Zhang et al., "Visual Search at Alibaba",KDD 2018, Aug. 19-23, 2018, London, United Kingdom,total:9pages.
(Continued)

*Primary Examiner* — Han Hoang

(57) ABSTRACT

A model training method relates to the artificial intelligence field. The method includes: obtaining a plurality of training samples, where each training sample includes an image and a text, and the text describes a target object in the image; and inputting the plurality of training samples into a target model, so that the target model performs the following procedure until a preset stop condition is met: extracting an image feature of a first image and a text feature of a first text; obtaining a first loss value based on a difference between a first vector and a second vector, where a dimension of the first vector is the same as a dimension of the second vector; and updating the target model based on the first loss value.

19 Claims, 12 Drawing Sheets

(51) Int. Cl.

| | | |
|---|---|---|
| *G06T 3/02* | (2024.01) | |
| *G06T 7/12* | (2017.01) | |
| *G06V 10/26* | (2022.01) | |
| *G06V 10/40* | (2022.01) | |
| *G06V 10/74* | (2022.01) | |
| *G06V 10/762* | (2022.01) | |
| *G06V 10/776* | (2022.01) | |

(52) U.S. Cl.
CPC ................ *G06T 7/12* (2017.01); *G06V 10/26* (2022.01); *G06V 10/40* (2022.01); *G06V 10/761* (2022.01); *G06V 10/762* (2022.01); *G06V 10/776* (2022.01); *G06T 2207/20081* (2013.01)

(58) Field of Classification Search
CPC .... G06V 10/776; G06V 10/82; G06F 40/289; G06F 18/253; G06F 18/256; G06F 18/211; G06F 18/214; G06T 3/02; G06T 7/12; G06T 2207/20081; G06N 20/00; G06N 3/0475; G06N 3/096; G06N 3/045; G06N 3/02; Y02T 10/40
See application file for complete search history.

(56) References Cited

U.S. PATENT DOCUMENTS

| | | | |
|---|---|---|---|
| 2020/0193269 A1 | 6/2020 | Park et al. | |
| 2020/0257922 A1* | 8/2020 | Huang ................. | G06V 30/224 |
| 2020/0278986 A1* | 9/2020 | Guha .................... | G06F 16/285 |
| 2020/0349464 A1* | 11/2020 | Lin ........................ | G06N 3/084 |
| 2021/0012198 A1 | 1/2021 | Zhang et al. | |
| 2022/0398504 A1* | 12/2022 | Chae ..................... | G06N 3/084 |

FOREIGN PATENT DOCUMENTS

| | | | |
|---|---|---|---|
| CN | 108829848 A | 11/2018 | |
| CN | 110019917 A | 7/2019 | |
| CN | 110163267 A | 8/2019 | |
| CN | 110209867 A | 9/2019 | |
| CN | 110414432 A | 11/2019 | |
| CN | 111209415 A | 5/2020 | |
| CN | 111930980 A | 11/2020 | |
| CN | 113159095 A | 7/2021 | |

OTHER PUBLICATIONS

Sean Bell et al., "GrokNet: Unified Computer Vision Model Trunk and Embeddings for Commerce",KDD "20, Aug. 23 27, 2020, Virtual Event, USA,total:9pages.
International Search Report dated Apr. 29, 2022, issued for International Application No. PCT/CN2022/073923 (11 pages).
Office Action dated Jun. 23, 2023 issued for Chinese Application No. 202110132038.4 (8 pages).

* cited by examiner

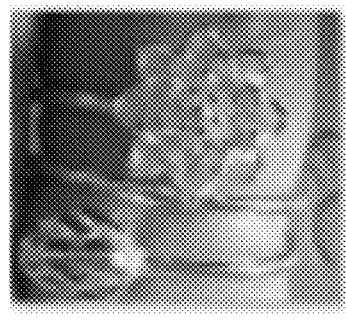
a
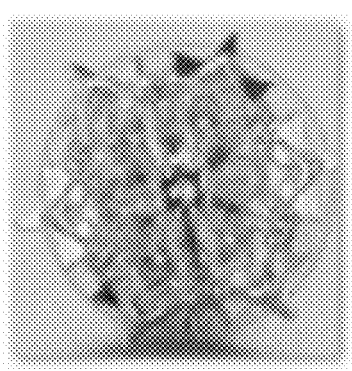
b
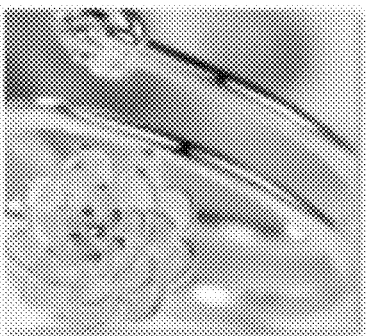
c
FIG. 2

Obtain a plurality of training samples — 301

Input the plurality of training samples into a target model, so that the target model performs step 3021 to step 3023 — 302

Extract an image feature of a first image and a text feature of a first text — 3021

Obtain a loss value 1 based on a difference between a first vector and a second vector — 3022

Update the target model based on the loss value 1 — 3023

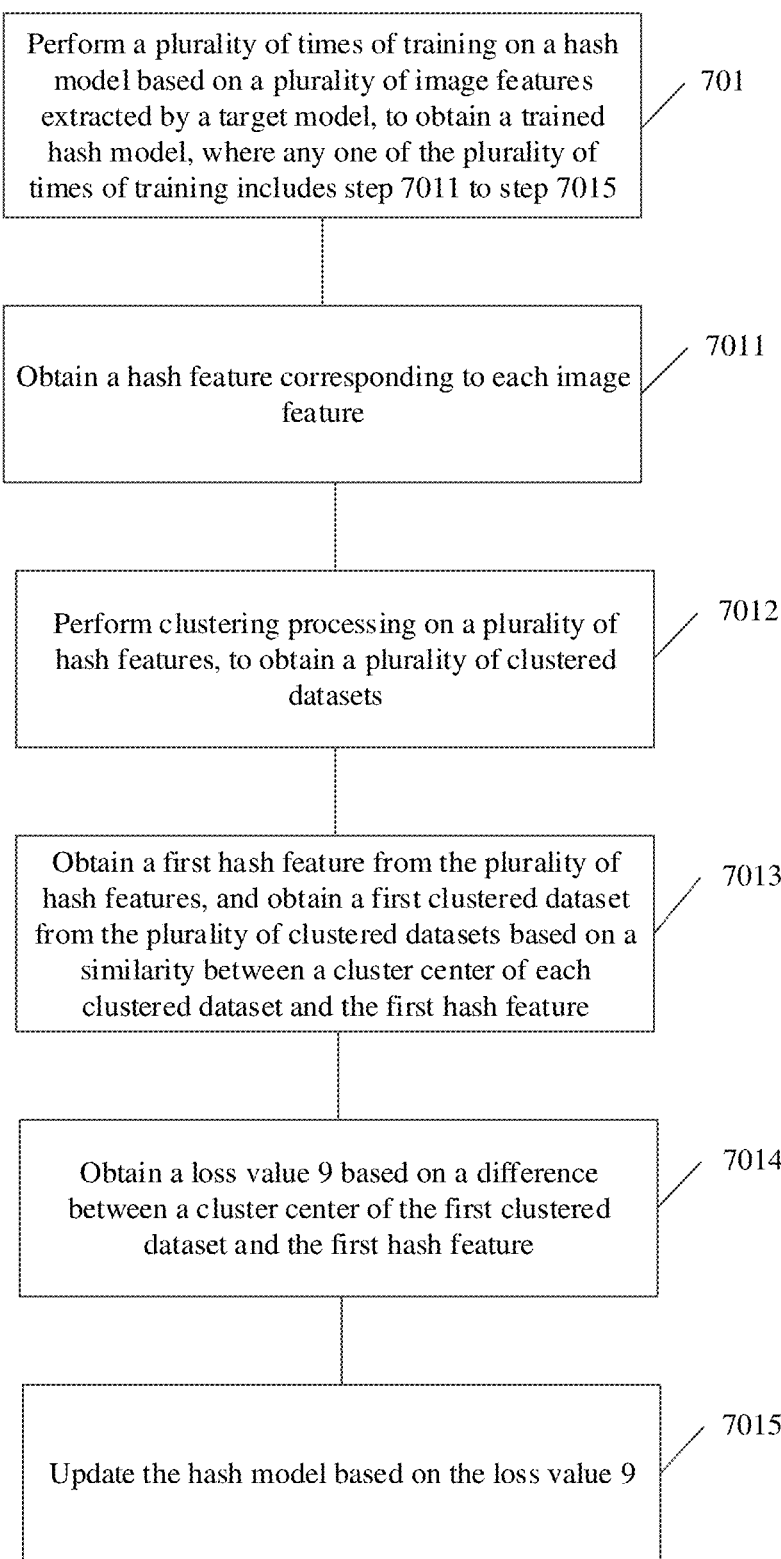

Perform a plurality of times of training on a hash model based on a plurality of image features extracted by a target model, to obtain a trained hash model, where any one of the plurality of times of training includes step 7011 to step 7015

701

Obtain a hash feature corresponding to each image feature

7011

Perform clustering processing on a plurality of hash features, to obtain a plurality of clustered datasets

7012

Obtain a first hash feature from the plurality of hash features, and obtain a first clustered dataset from the plurality of clustered datasets based on a similarity between a cluster center of each clustered dataset and the first hash feature

7013

Obtain a loss value 9 based on a difference between a cluster center of the first clustered dataset and the first hash feature

7014

Update the hash model based on the loss value 9

Obtain a to-be-retrieved image ⟋ 1001

Extract an image feature of the to-be-retrieved image by using a target model ⟋ 1002

Obtain a predicted image from an image database based on the image feature of the to-be-retrieved image ⟋ 1003

MODEL TRAINING METHOD, IMAGE RETRIEVAL METHOD, AND APPARATUS

CROSS-REFERENCE TO RELATED APPLICATIONS

This application is a continuation of International Application No. PCT/CN2022/073923, filed on Jan. 26, 2022, which claims priority to Chinese Patent Application No. 202110132038.4, filed on Jan. 30, 2021. The disclosures of the aforementioned applications are hereby incorporated by reference in their entireties.

TECHNICAL FIELD

This disclosure relates to the image processing field, and in particular, to a model training method, an image retrieval method, and an apparatus.

BACKGROUND

Artificial intelligence (AI) is a theory, a method, a technology, and an application system for simulating, extending, and expanding human intelligence by using a digital computer or a machine controlled by a digital computer, to perceive an environment, obtain knowledge, and obtain an optimal result based on the knowledge. In other words, artificial intelligence is a branch of computer science, and attempts to understand essence of intelligence and produce a new intelligent machine that can react in a manner similar to human intelligence. Artificial intelligence is to research design principles and implementation methods of various intelligent machines, so that the machines have functions of perception, inference, and decision making. Research in the artificial intelligence field includes robotics, natural language processing, computer vision, decision making and inference, human-machine interaction, recommendation and search, basic AI theories, and the like.

Image retrieval is one of the most concerned issues in computer vision, and product image retrieval is a very important part of image retrieval. Product image retrieval is obtaining an image feature of a product image based on the product image input by a user, retrieving a corresponding product from an image database based on the image feature, and presenting the product to the user. A product image retrieval technology is widely applied in an e-commerce industry, and has a great business value.

Product image retrieval requires that a returned result is completely the same as a product corresponding to a queried image. However, the image database may include a large quantity of products with similar appearances. This poses a great challenge to product image retrieval. In addition, because different users photograph products at different photographing angles and in different photographing environments, an input product image may be considerably different from a product image in the image database. Therefore, how to improve precision of product image retrieval is an urgent problem to be resolved.

SUMMARY

Embodiments of this disclosure provide a model training method, an image retrieval method, and an apparatus. Performing an image retrieval task by using an image feature obtained according to the model training method provided in embodiments of this disclosure can effectively improve image retrieval precision and an image retrieval speed, and reduce a requirement on storage performance of an image database.

To achieve the foregoing objective, embodiments of this disclosure provide the following technical solutions.

A first aspect of this disclosure provides a model training method. The method may include: obtaining a plurality of training samples, where each training sample may include an image and a text, and the text describes a target object in the image, where there may be one or more target objects; and inputting the plurality of training samples into a target model, so that the target model performs the following procedure until a preset stop condition is met: extracting an image feature of a first image and a text feature of a first text, where different image feature extraction models are selected to extract image features of images in all the training samples, for example, an image feature may be extracted by using ResNet 50 or SEResNet 50, and for another example, an image feature may be extracted by using an EfficientNetB3 model, and different text feature extraction models are selected to extract text features of texts in all the training samples, for example, a text feature may be extracted by using a GPT model, and for another example, a text feature may be extracted by using a Bert model; and the first image is an image that may be included in any one of the plurality of training samples, and the first text describes a target object in the first image; obtaining a first loss value based on a difference between a first vector and a second vector, where a dimension of the first vector is the same as a dimension of the second vector, the first vector indicates the image feature of the first image, and the second vector indicates the text feature of the first text; and updating the target model based on the first loss value. According to the solution provided in this disclosure, a difference between an image feature and a text feature is reduced in homogeneous space. The preset stop condition may be understood as that the target model is converged or a preset quantity of iteration rounds is reached. Because a model training process is a process of continuously reducing a loss value, when the target model is updated based on a loss value 1, the loss value 1 continuously decreases, so that a distance between vectors respectively corresponding to an image feature and a text feature of a same product is shorter. Compared with training the target model based on only an image feature, in the solution provided in this disclosure, a text feature is also used in a training process of the target model. An image feature extracted by using a target model trained according to the solution provided in this disclosure has a better image representation capability.

In a possible implementation, the method may further include: predicting at least one attribute of the target object in the first image based on the image feature of the first image; and obtaining a second loss value based on a difference between the at least one attribute and a preset tag, where the preset tag is obtained through word segmentation preprocessing performed on the first text. The updating the target model based on the first loss value may include: updating the target model based on the first loss value and the second loss value. To deepen guidance of using a text feature for extracting an image feature by the target model, during prediction of a plurality of attributes of a target object included in an image, a keyword in a text is used as a preset tag to perform multi-class supervision. In this way, when the target model performs, based on the image feature, attribute prediction on the target object described by the text, a prediction result (at least one attribute) is closer to the preset tag.

In a possible implementation, the method may further include: predicting, based on the image feature of the first image, a first probability that the target object in the first image belongs to each target object in an object set, where the object set may include target objects that may be included in all images in the plurality of training samples; predicting, based on the text feature of the first text, a second probability that the first text describes each target object in the object set; and obtaining a third loss value based on a difference between the first probability and the second probability. The updating the target model based on the first loss value may include: updating the target model based on the first loss value, the second loss value, and the third loss value. To further improve performance of the target model, and further improve an image representation capability of an image feature extracted by the target model, a classification result predicted based on the image feature may be further made closer to a classification result predicted based on a text feature. The classification result is a predicted probability that a product belongs to each target object in the object set. The object set is the target objects included in all the images in all the training samples.

In a possible implementation, the method may further include: obtaining a fourth loss value based on a difference between the first probability and a first preset value, where the first preset value indicates a preset probability that the target object in the first image belongs to each target object in the object set; and obtaining a fifth loss value based on a difference between the second probability and a second preset value, where the second preset value indicates a preset probability that the first text describes each target object in the object set. The updating the target model based on the first loss value may include: updating the target model based on the first loss value, the second loss value, the third loss value, the fourth loss value, and the fifth loss value. To further improve performance of the target model, and further improve an image representation capability of an image feature extracted by the target model, a classification result predicted based on the image feature may be further made closer to a classification of a target object actually included in an image, and an object described by a classification result predicted based on a text feature may be further made closer to the classification of the target object actually included in the image.

In a possible implementation, the method may further include: obtaining a sixth loss value based on a difference between the image feature of the first image and an image feature of a second image, where the second image and the first image present the same target object from different angles. The updating the target model based on the first loss value may include: updating the target model based on the first loss value, the second loss value, the third loss value, the fourth loss value, the fifth loss value, and the sixth loss value. To further improve performance of the target model, and further improve an image representation capability of an image feature extracted by the target model, image features of a same product may be further made closer to each other, and image features of different products may be further made farther from each other.

In a possible implementation, the method may further include: obtaining a first distance between the first vector and a third vector, and obtaining a second distance between the first vector and a fourth vector, where the third vector indicates the image feature of the second image, the fourth vector indicates an image feature of a third image, and a target object that may be included in the third image is different from the target object that may be included in the first image; and obtaining a seventh loss value based on a difference between a preset threshold and a difference between the first distance and the second distance. The updating the target model based on the first loss value may include: updating the target model based on the first loss value, the second loss value, the third loss value, the fourth loss value, the fifth loss value, the sixth loss value, and the seventh loss value. To further improve performance of the target model, and further improve an image representation capability of an image feature extracted by the target model, image features of different products are sufficiently differentiated.

In a possible implementation, the obtaining a plurality of training samples may include: obtaining a first target image of a product, a text title of the product, and a second target image of the product, where the first target image comes from a provider of the product, and the second target image comes from a buyer of the product; using the first target image as an input of a segmentation model to obtain a segmentation result, where the segmentation result indicates a contour of the product in the first target image; extracting a target area of a third target image based on the segmentation result, where the third target image is obtained by inputting the first target image into a generator, and the image provided by the provider of the product and the image provided by the buyer of the product are used for a training process of the generator; performing random affine transformation on the target area to obtain a transformed target area; combining the transformed target area and a preset background to obtain a fourth target image; and obtaining a first-type training sample, a second-type training sample, and a third-type training sample, where each first-type training sample may include the first target image and the text title, each second-type training sample may include the second target image and the text title, and each third-type training sample may include the fourth target image and the text title. In this implementation, in absence of a buyer show, a large amount of buyer-show data is generated by using a seller show, so that a trained target model has specific robustness for a complex buyer-show image style, and retrieval difficulty caused by a large change of a photographing angle of a user can be alleviated to a specific extent.

In a possible implementation, the method may further include: performing a plurality of times of training on a hash model based on a plurality of image features extracted by the target model, to obtain a trained hash model, where any one of the plurality of times of training may include: obtaining a hash feature corresponding to each image feature; performing clustering processing on a plurality of hash features, to obtain a plurality of clustered datasets; obtaining a first hash feature from the plurality of hash features, where the first hash feature is any one of the plurality of hash features; obtaining a first clustered dataset from the plurality of clustered datasets based on a similarity between a cluster center of each clustered dataset and the first hash feature, where a similarity between a cluster center of the first clustered dataset and the first hash feature is the highest in the plurality of clustered datasets; obtaining an eighth loss value based on a difference between the cluster center of the first clustered dataset and the first hash feature; and updating the hash model based on the eighth loss value. To not only improve image retrieval precision but also improve an image retrieval speed and reduce a requirement on a storage capability of an image database, the solution provided in this disclosure provides an end-to-end design, to perform joint optimization on a hash feature and an inverted codebook.

In a possible implementation, the updating the target model based on the first loss value may include: updating the target model based on the first loss value, the second loss value, the third loss value, the fourth loss value, the fifth loss value, the sixth loss value, the seventh loss value, and the eighth loss value.

In a possible implementation, any one of the plurality of times of training may further include: applying a first constraint and a second constraint to a target hash feature, to obtain an updated target hash feature, where the target hash feature is a hash feature obtained based on a last updated hash model, the first constraint is that quantities of third preset values and fourth preset values in the hash feature are average, the second constraint is that an element on a first diagonal of a target matrix is the fourth preset value and an element other than the first diagonal in the target matrix is the third preset value, an element in the $i^{th}$ row and the $j^{th}$ column in the target matrix represents an average value of a plurality of target elements, the plurality of target elements represent products of values of the $i^{th}$ dimension of the hash features and values of the $j^{th}$ dimension of the hash features, and i and j are positive integers; comparing a value of each dimension of the target hash feature and a second mean, where the second mean is an average value of the third preset value and the fourth preset value; and when the value of each dimension is less than the second mean, obtaining a ninth loss value based on a difference between the value of each dimension of the hash feature and the third preset value; or when the value of each dimension is not less than the second mean, obtaining a ninth loss value based on a difference between the value of each dimension of the hash feature and the fourth preset value. The updating the hash model based on the eighth loss value may include: updating the hash model based on the eighth loss value and the ninth loss value.

A second aspect of this disclosure provides an image retrieval method. The method may include: obtaining a to-be-retrieved image; extracting an image feature of the to-be-retrieved image by using a target model; and obtaining a predicted image from an image database based on the image feature of the to-be-retrieved image, where a similarity between an image feature of the predicted image and the image feature of the to-be-retrieved image reaches a threshold. The target model is a model obtained by updating an initial target model based on a first loss value. The initial target model may be a model obtained in advance. The first loss value is obtained based on a difference between a first vector and a second vector, a dimension of the first vector is the same as a dimension of the second vector, the first vector indicates an image feature of a first image, the second vector indicates a text feature of a first text, the first image is an image that may be included in any one of a plurality of training samples, the first text describes a target object in the first image, each training sample may include an image and a text, and the text describes a target object in the image.

In a possible implementation, the target model is specifically a model obtained by updating the initial target model based on the first loss value and a second loss value, the second loss value is obtained based on a difference between at least one attribute and a preset tag, and the at least one attribute is at least one attribute that is of the target object in the first image and that is predicted based on the image feature of the first image.

In a possible implementation, the target model is specifically obtained by updating the initial target model based on the first loss value, the second loss value, and a third loss value, the third loss value is obtained based on a difference between a first probability and a second probability, the first probability is predicted based on the image feature of the first image and is a probability that the target object in the first image belongs to each target object in an object set, and the second probability is predicted based on the text feature of the first text and is a probability that the first text describes each target object in the object set.

In a possible implementation, the target model is specifically a model obtained by updating the initial target model based on the first loss value, the second loss value, the third loss value, a fourth loss value, and a fifth loss value, the fourth loss value is obtained based on a difference between the first probability and a first preset value, the first preset value indicates a preset probability that the target object in the first image belongs to each target object in the object set, the fifth loss value is obtained based on a difference between the second probability and a second preset value, and the second preset value indicates a preset probability that the first text describes each target object in the object set.

In a possible implementation, the target model is specifically obtained by updating the initial target model based on the first loss value, the second loss value, the third loss value, the fourth loss value, the fifth loss value, and a sixth loss value, the sixth loss value is obtained based on a difference between the image feature of the first image and an image feature of a second image, and the second image and the first image present the same target object from different angles.

In a possible implementation, the target model is specifically obtained by updating the initial target model based on the first loss value, the second loss value, the third loss value, the fourth loss value, the fifth loss value, the sixth loss value, and a seventh loss value, the seventh loss value is obtained based on a difference between a preset threshold and a difference between a first distance and a second distance, the first distance is a distance between the first vector and a third vector, the second distance is a distance between the first vector and a fourth vector, the third vector indicates the image feature of the second image, the fourth vector indicates an image feature of a third image, and a target object that may be included in the third image is different from a target object that may be included in the first image.

In a possible implementation, the plurality of training samples may include a first-type training sample, a second-type training sample, and a third-type training sample, each first-type training sample may include a first target image and a text title, each second-type training sample may include a second target image and the text title, each third-type training sample may include a fourth target image and the text title, the first target image comes from a provider of a product, the second target image comes from a buyer of the product, the text title is a text title of the product, the fourth target image is obtained by combining a transformed target area and a preset background, the transformed target area is obtained through random affine transformation performed on a target area, the target area is obtained through extraction from a third target image based on a segmentation result, the third target image is obtained by inputting the first target image into a generator, the image provided by the provider of the product and the image provided by the buyer of the product are used for a training process of the generator, the segmentation result is a result obtained by using the first target image as an input of a segmentation model, and the segmentation result indicates a contour of the product in the first target image.

In a possible implementation, the method may further include: inputting the image feature of the to-be-retrieved image into a hash model, to obtain a hash feature of the to-be-retrieved image. The obtaining a predicted image from an image database based on the image feature of the to-be-retrieved image may include: obtaining the predicted image from the image database based on the hash feature of the to-be-retrieved image, where the hash model is obtained by updating an initial hash model based on an eighth loss value, the initial hash model is obtained in advance, the eighth loss value is obtained based on a difference between a cluster center of a first clustered dataset and a first hash feature, the cluster center of the first clustered dataset is a cluster center with a highest similarity to the first hash feature in cluster centers of all clustered datasets in a plurality of pieces of clustered data, the plurality of clustered datasets are obtained through clustering processing performed on a plurality of hash features, and the first hash feature is any one of the plurality of hash features.

In a possible implementation, the target model is specifically obtained by updating the initial target model based on the first loss value, the second loss value, the third loss value, the fourth loss value, the fifth loss value, the sixth loss value, the seventh loss value, and the eighth loss value.

A third aspect of this disclosure provides a model training apparatus. The apparatus may include a memory, configured to store computer-readable instructions; and a processor coupled to the memory, configured to execute the computer-readable instructions in the memory, so as to perform the method according to the first aspect.

A fourth aspect of this disclosure provides an image retrieval device. The device may include a memory, configured to store computer-readable instructions; and a processor coupled to the memory, configured to execute the computer-readable instructions in the memory, so as to perform the method according to the second aspect.

A fifth aspect of this disclosure provides a chip system. The chip system may include a processor and a communication interface. The processor obtains program instructions by using the communication interface. When the program instructions are executed by the processor, the method according to the first aspect is implemented.

A sixth aspect of this disclosure provides a chip system. The chip system may include a processor and a communication interface. The processor obtains program instructions by using the communication interface. When the program instructions are executed by the processor, the method according to the second aspect is implemented.

A seventh aspect of this disclosure provides a computer-readable storage medium. The computer-readable storage medium may include a program. When the program is executed by a processing unit, the method according to the first aspect is performed.

An eighth aspect of this disclosure provides a computer-readable storage medium. The computer-readable storage medium may include a program. When the program is executed by a processing unit, the method according to the second aspect is performed.

A ninth aspect of this disclosure provides a computer program product. When the computer program product is run on a computer, the computer is enabled to perform the method according to the first aspect.

A tenth aspect of this disclosure provides a computer program product. When the computer program product is run on a computer, the computer is enabled to perform the method according to the second aspect.

According to the solutions provided in this disclosure, image feature learning is guided by using a text feature, so as to improve an image representation capability of an image feature extracted by using the target model. In addition, a keyword may be obtained by preprocessing a text, and during prediction of a plurality of attributes of a target object included in an image, multi-class supervision is performed by using the keyword in the text as a preset tag, thereby further improving a representation capability of an image feature. As a representation capability of an image feature is improved, the image feature can represent a feature of an image more accurately, thereby helping improve precision of image retrieval performed based on the image feature.

BRIEF DESCRIPTION OF DRAWINGS

FIG. 2 is a schematic diagram of an application scenario of a solution according to an embodiment of this disclosure;

FIG. 7 is a schematic diagram of another execution procedure of a target model according to an embodiment of this disclosure;

DESCRIPTION OF EMBODIMENTS

Embodiments of this disclosure provide a model training method, an image retrieval method, and an apparatus. According to solutions provided in embodiments of this disclosure, image retrieval precision and an image retrieval speed can be improved, and a requirement on a storage space of an image database can be reduced. The solutions provided in this disclosure can particularly improve goods image retrieval precision and a goods image retrieval speed, and reduce a requirement on a storage space of a goods image database.

To better understand the solutions provided in this disclosure, the following first describes typical scenarios to which the solutions provided in this disclosure may be applicable.

Figure 1:
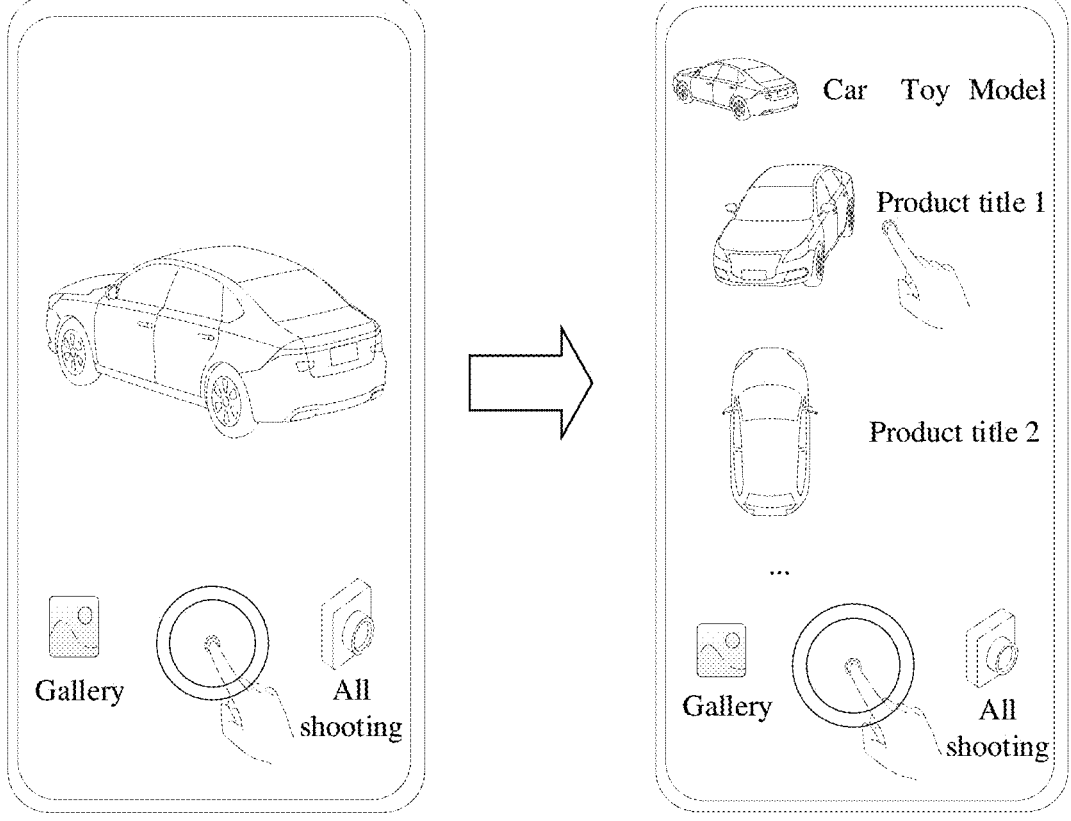
FIG. 1 is a schematic diagram of an application scenario of a solution according to an embodiment of this disclosure.

FIG. 1 is a schematic diagram of an application scenario of a solution according to an embodiment of this disclosure. A typical application scenario of the solutions provided in this disclosure is product retrieval through photographing. When a user encounters a product that the user is satisfied with, the user may photograph the product by using a terminal device such as a mobile phone. The terminal device may perform an image retrieval task based on an obtained image, or the terminal device and another device (for example, a cloud server) jointly perform an image retrieval task, and then, the terminal device may present, to the user, a link of a product that is the same as the product. The user may select from at least one presented same product for purchase.

An example in which a terminal device and a cloud server jointly perform an image retrieval task is used to explain the image retrieval task. After obtaining an image of a product, the terminal may upload the image to the cloud server. After extracting an image feature of the image, the cloud server performs, based on the extracted image feature, retrieval on data stored in an image database, to obtain a product that is the same as the product, and sends a link of the same product to the terminal.

Currently, product image retrieval has at least the following difficulties:

(1) Retrieval precision is difficult to improve.

An image database usually includes a large quantity of similar products, and an appearance difference between the similar products is small. This poses a great challenge to product retrieval. For example, referring to FIG. 2 for understanding, it is assumed that a in FIG. 2 is a product image input by a user. Because an appearance of a jewel presented by b in FIG. 2 is very similar to an appearance of a jewel presented by a in FIG. 2, after an image retrieval task is performed, a product corresponding to b in FIG. 2 may be preferentially presented to the user. In addition, a product image photographed by a user may be considerably different from a product image stored in an image database. For example, for a same product, the product image photographed by the user is a in FIG. 2, and a product image stored in an image database is c in FIG. 2. Due to a difference between the two product images, when the image retrieval task is performed, retrieval precision is low, and it is difficult to retrieve c in FIG. 2 from the image database based on a in FIG. 2. The difference may be understood as different photographing angles, different photographing environments, and the like.

(2) A retrieval speed is difficult to improve.

Some large-scale image retrieval systems include large quantities of product categories and product images. Retrieving a required image from these large-scale image retrieval systems usually costs a large amount of time. An excessively long retrieval time affects user experience. Therefore, how to improve an image retrieval speed, especially a retrieval speed of a large-scale image retrieval system, needs to be urgently resolved.

(3) A requirement on a storage capability of an image database is high.

An extracted image feature of an image is usually floating-point data. To reduce a requirement on a storage capability of an image database, an image feature may be converted, for example, floating-point data is converted into a binary hash value. In a possible implementation, hash processing may be performed on an image feature to obtain a hash feature. An image database stores a hash feature of each image. In this manner, a requirement on a storage capability of an image database can be reduced to a specific extent. However, performing hash processing on an image feature leads to reduction of image representation precision, which causes an error. In addition, to increase a retrieval speed, an inverted codebook needs to be used during execution of an image retrieval task. Using the inverted codebook also introduces an error. Specifically, clustering processing is performed on a plurality of hash features to obtain a plurality of clustered datasets. Each of the plurality of clustered datasets corresponds to one cluster center. The cluster center may be understood as an average value of all hash features included in one clustered dataset. A set of all cluster centers of all clustered datasets is referred to as an inverted codebook. During execution of an image retrieval task, a hash feature of an image is obtained, one or more cluster centers with a highest similarity to the hash feature are searched for from an inverted codebook based on the hash feature of the image, a clustered dataset corresponding to the one or more cluster centers with a highest similarity is obtained, and a same product included in the input image is searched for from hash features included in the clustered dataset. In this manner, during execution of an image retrieval task, retrieval is performed on hash features included in only one or more clustered datasets, and retrieval is no longer performed on hash features included in another clustered dataset. If a same product included in an input image is in other clustered data, the same product cannot be retrieved in this manner. Therefore, in this manner, although a requirement on a storage capability of an image database can be reduced, a large error is also caused, leading to reduction of retrieval precision or low retrieval efficiency. To resolve the foregoing problem, embodiments of this disclosure provide a model training method and an image retrieval method. According to the solutions provided in this disclosure, retrieval precision and retrieval efficiency can be improved, and a requirement on a storage capability of an image database can also be reduced.

For better understanding of this disclosure, the following specifically describes a research idea of the technical solutions described in this disclosure.

The above-mentioned problem in (1) that retrieval precision is difficult to improve is usually caused by a data imbalance problem in a training sample set. Specifically, an image provided by a user and an image provided by a product provider are unbalanced. For example, usually, a shopping-type web page may be crawled by using a crawler technology, to obtain an image provided by a user and an image provided by a product provider. In this disclosure, sometimes, an image provided by a user is also referred to as an image provided by a product buyer, or referred to as a buyer show, representing a same meaning. In this disclosure, sometimes, an image provided by a product provider is also referred to as a seller show, representing a same meaning. Usually, a buyer show may be obtained by crawling a comment area of a product. In some scenarios, in comment areas of some products, there may be no buyer show, or buyer shows are irrelevant to the products. This results in a problem of buyer show absence for these products. Based on such problems, consequently, obtained buyer shows and seller shows are unbalanced, and a training sample set including the obtained buyer shows and seller shows is an unbalanced training sample set. If a model is trained by using an unbalanced training sample set, the trained model cannot extract an image feature well. For example, a training data set does not include a sufficient quantity of buyer shows, and as a result, a model cannot well learn buyer-show image feature extraction in a training process. When a trained model is applied to performing an image retrieval task, if an extracted buyer-show image feature is not ideal, retrieval precision is affected. Therefore, to improve image retrieval precision, a training sample set should be balanced as much as possible. In other words, seller-show data and buyer-show data in a training sample set should be balanced. In addition, the above-mentioned problem in (1) that retrieval precision is difficult to improve may also be caused by an excessively large quantity of similar products. To resolve this problem, one manner is to manually mark similar products, so that each product has a more accurate tag or attribute. However, in this manner, a large quantity of manpower and material resources need to be invested, and a period of obtaining a training sample is long. This is not conducive to quick launching of an image retrieval system. Based on these considerations, in the solutions provided in this disclosure, a buyer show is generated by using a seller show, and the generated buyer show is further processed according to the solution provided in this disclosure, thereby obtaining a large quantity of images close to real buyer shows. In this manner, a problem of buyer-show data absence or a mismatch between a buyer show and a product in a training sample set is effectively resolved, so that the training sample set is balanced. In addition, according to the solutions provided in this disclosure, a text description of a product is obtained, for example, a product title that is set by a seller is obtained. A difference between an image feature and a text feature of a same product is reduced in homogeneous space, to guide model training by using a text feature, so that an image feature extracted by a model is more ideal and can better represent a product feature. In addition, in the solutions provided in this disclosure, manual marking is not required. According to the solutions provided in this disclosure, a keyword may be obtained by using a text description of a product, and the keyword is used as a mark of the product. According to these implementations, image retrieval precision can be further improved.

The above-mentioned problem in (2) that a retrieval speed is difficult to improve and the above-mentioned problem in (3) that a requirement on a storage capability of an image database is high may be resolved in the manner mentioned in (3). When a hash feature represents an image feature, a storage space that needs to be occupied by a unit representing the image is smaller, so that a retrieval speed can be improved, and a requirement on a storage capability of an image database is also reduced. A unit representing an image may be understood as including an image feature and a hash feature. However, the foregoing also mentions that the manner in (3) causes a problem that a plurality of errors are introduced, which leads to reduction of retrieval precision. Therefore, the solution provided in this disclosure is an end-to-end design, where joint optimization is performed on a hash feature and an inverted codebook.

Based on the foregoing research idea, the following specifically describes the technical solutions provided in this disclosure.

The following describes the solutions provided in this disclosure from two aspects: a training side and an application side. The solutions provided in this disclosure are first described from the training side.

(1) Model Training

Figure 3:
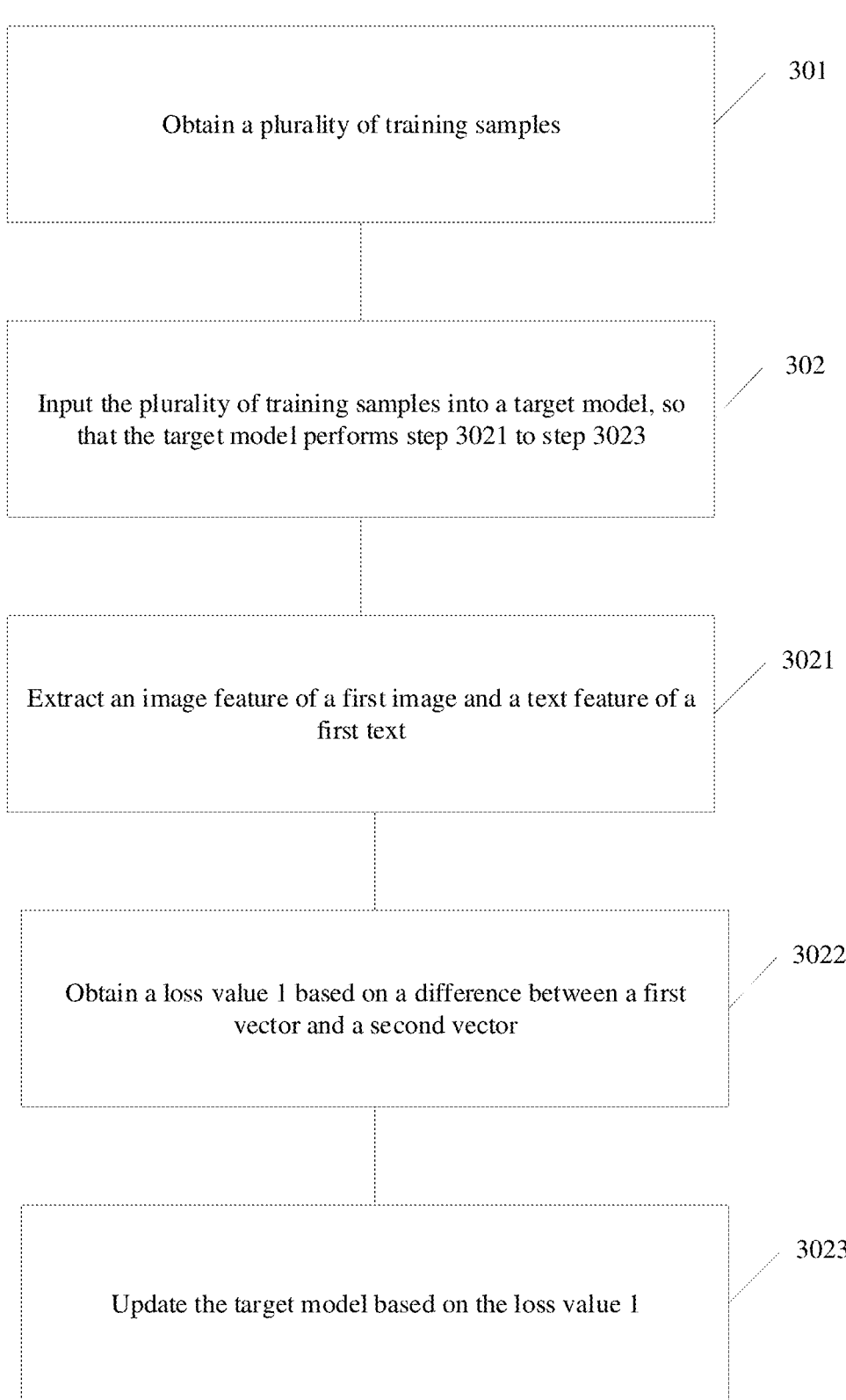
FIG. 3 is a schematic flowchart of a model training method according to an embodiment of this disclosure.

FIG. 3 is a schematic flowchart of a model training method according to an embodiment of this disclosure.

As shown in FIG. 3, the model training method provided in this embodiment of this disclosure may include the following steps.

301: Obtain a plurality of training samples.

Each training sample includes an image and a text, and the text describes a target object in the image. In other words, each training sample includes two types of data: image data and text data, and the text data describes a target object in the image data, where there may be one or more target objects.

In addition, the target object in this disclosure is a product. For example, a training sample 1 includes an image 1 and a text 1. The image 1 includes a person and a garment, and a target object is the garment. The text may be "short white down jacket, new style in 2020, shiny surface, fashionable, light, thin, high-end, and popular". For another example, a training sample 2 includes an image 2 and a text 2. The image 2 includes chopsticks, a fork, a bowl, and a plate, and target objects include the chopsticks, the fork, the bowl, and the plate. The text may be "lightly luxurious, golden edges, bone china, kit of bowls and dishes, for household use, Jingdezhen bowl-and-chopstick tableware combination, house-warming gift".

In the solution provided in this disclosure, the plurality of training samples may be obtained in a plurality of manners. For example, an Internet web page including shopping information may be crawled by using a crawler tool, to obtain the plurality of training samples. For another example, the plurality of training samples may be obtained by using an existing public dataset.

302: Input the plurality of training samples into a target model, so that the target model performs step 3021 to step 3023.

3021: Extract an image feature of a first image and a text feature of a first text.

The first image is an image included in any one of the plurality of training samples, and the first text describes a target object in the first image. A person skilled in the art may select different image feature extraction models based on requirements to extract image features of images in all the training samples. For example, an image feature may be extracted by using ResNet 50 or SEResNet 50. A person skilled in the art may select different text feature extraction models based on requirements to extract text features of texts in all the training samples. For example, a text feature may be extracted by using a GPT model. In a preferred implementation, an image feature of an image in each training sample may be extracted by using an Efficient-NetB3 model. In a preferred implementation, a text feature of a text in each training sample may be extracted by using a Bert model.

3022: Obtain a loss value 1 based on a difference between a first vector and a second vector.

The image feature and the text feature are converted into vectors of a same dimension. For example, the image feature of the first image is represented by using the first vector, and the text feature of the first text is represented by using the second vector. In other words, the first vector indicates the image feature of the first image, the second vector indicates the text feature of the first text, and a dimension of the first vector is the same as a dimension of the second vector. The loss value 1 is obtained based on the difference between the first vector and the second vector. For example, the following formula 1-1 provides a calculation formula of the loss value 1:

$$J_1 = \frac{1}{n^2} \sum_{i,j=1}^{n} (\log(1 + e^{\alpha_{i,j}}) - 1\{u_i, v_j\} * \alpha_{i,j}) \tag{1-1}$$

where n represents a total quantity of the training samples, $u_i$ represents a vector corresponding to an image feature in the $i^{th}$ sample, $v_j$ represents a vector corresponding to a text feature in the $j^{th}$ sample, and $\alpha_{i,j}$ represents a distance between the vector corresponding to the image feature in the $i^{th}$ sample and the vector corresponding to the text feature in the $j^{th}$ sample.

3023: Update the target model based on the loss value 1.

According to the solution provided in this disclosure, a difference between an image feature and a text feature is reduced in homogeneous space. Because a model training process is a process of continuously reducing a loss value, when the target model is updated based on the loss value 1, the loss value 1 continuously decreases, so that a distance between vectors respectively corresponding to an image feature and a text feature of a same product is shorter. Compared with training the target model based on only an image feature, in the solution provided in this disclosure, a text feature is also used in a training process of the target model. An image feature extracted by using a target model trained according to the solution provided in this disclosure has a better image representation capability.

To further improve performance of the target model, and further improve an image representation capability of an image feature extracted by the target model, image features of a same product may be further made closer to each other, image features of different products may be further made farther from each other, text features of a same product may be further made closer to each other, and text features of different products may be further made farther from each other. Therefore, in a possible implementation, a loss value 2 and a loss value 3 may be further introduced in the solution provided in this disclosure. The loss value 2 indicates a difference between image features of a same product, and the loss value 3 indicates a difference between text features of a same product. For example, the loss value 2 is obtained based on a difference between the image feature of the first image and an image feature of a second image. The second image and the first image present the same target object from different angles, that is, target objects included in the second image and the first image are the same. The "different angles" may be understood as different perspectives, different attributes, or the like. For example, the target objects in the first image and the second image are weighing scales of a same model. The first image presents the weighing scale from a top view angle, and the second image presents the weighing scale from a side view angle. It is assumed that weighing scales of the model include silvery weighing scales and golden weighing scales. The first image presents the silvery weighing scale, and the second image presents the golden weighing scale. For example, the loss value 2 may be understood with reference to a formula 1-2, and the loss value 3 may be understood with reference to a formula 1-3:

$$J_2 = \frac{1}{n^2}\sum\nolimits_{i,j=1}^{n}\left(\log\left(1 + e^{\beta_{i,j}}\right) - 1\{u_i, u_j\} * \beta_{i,j}\right) \qquad (1\text{-}2)$$

where n represents the total quantity of the training samples, $u_i$ represents the vector corresponding to the image feature in the $i^{th}$ sample, $u_j$ represents a vector corresponding to an image feature in the $i^{th}$ sample, and $\beta_{i,j}$ represents a distance between the vector corresponding to the image feature in the $i^{th}$ sample and the vector corresponding to the image feature in the $j^{th}$ sample; and $$J_3 = \frac{1}{n^2}\sum\nolimits_{i,j=1}^{n}(\log(1 + e^{\gamma_{i,j}}) - 1\{v_i, v_j\} * \gamma_{i,j}) \qquad (1\text{-}3)$$

where n represents the total quantity of the training samples, $v_i$ represents a vector corresponding to a text feature in the $i^{th}$ sample, $v_j$ represents a vector corresponding to a text feature in the $i^{th}$ sample, and $\gamma_{i,j}$ represents a distance between the vector corresponding to the text feature in the $i^{th}$ sample and the vector corresponding to the text feature in the $j^{th}$ sample.

Therefore, based on the embodiment corresponding to FIG. 3, in a possible implementation, the target model may be updated based on the loss value 1 and the loss value 2, and a total loss is a sum of J1 and J2. In a possible implementation, the target model may be updated based on the loss value 1, the loss value 2, and the loss value 3, and a total loss is a sum of J1, J2, and J3.

To further improve performance of the target model, and further improve an image representation capability of an image feature extracted by the target model, a classification result predicted based on the image feature may be further made closer to a classification result predicted based on a text feature. The classification result is a predicted probability that a product belongs to each target object in an object set. The object set is the target objects included in all the images in all the training samples. In a possible implementation, the method further includes: predicting, based on the image feature of the first image, a first probability that the target object in the first image belongs to each target object in the object set, where the object set includes the target objects included in all the images in the plurality of training samples; predicting, based on the text feature of the first text, a second probability that the first text describes each target object in the object set; and obtaining a loss value 4 based on a difference between the first probability and the second probability. For example, it is assumed that the training samples include a training sample 1, a training sample 2, and a training sample 3. The training sample 1 includes an image 1 and a text 1, the training sample 2 includes an image 2 and a text 2, and the training sample 3 includes an image 3 and a text 3. The image 1 includes a target object electric rice cooker, and the text 1 is "brand B electric rice cooker, for household use, 4 L, intelligent, large capacity, multi-functional rice cooker, for three or four persons". The image 2 includes a target object pressure cooker, and the text 2 is "brand A electric pressure cooker, for household use, intelligent, 5 L, electric pressure cooker, multi-functional, full-automatic". The image 3 includes a target object heating lunch box, and the text 3 is "brand C heating electric cooker box, lunch box". In this example, the object set includes the target objects included in all the images, and the object set includes the electric rice cooker, the electric pressure cooker, and the heating lunch box. It is assumed that the current target model extracts an image feature of the image and a text feature of the text that are included in the training sample 1, that is, extracts the image feature of the image 1 and the text feature of the text 1. It is assumed that it is predicted, based on the image feature of the image 1, that a probability that the target object in the image 1 belongs to an electric rice cooker is 0.6, a probability that the target object belongs to an electric pressure cooker is 0.3, and a probability that the target object belongs to a heating lunch box is 0.1. It is assumed that it is predicted, based on the text feature of the text 1, that a probability that the target object described by the text 1 belongs to an electric rice cooker is 0.9, a probability that the described target object belongs to an electric pressure cooker is 0.1, and a probability that the described target object belongs to a heating lunch box is 0. Therefore, a classification result predicted based on an image feature is closer to a classification result predicted based on a text feature, and a classification result predicted based on a text feature is also closer to a classification result predicted based on an image feature. An example in which a classification result predicted based on an image feature is closer to a classification result predicted based on a text feature is used for description. The probability, predicted based on the image feature of the image 1, that the target object in the image 1 belongs to an electric rice cooker is close to the probability, predicted based on the text feature of the text 1, that the target object described by the text 1 belongs to an electric rice cooker; the probability, predicted based on the image feature of the image 1, that the target object in the image 1 belongs to an electric pressure cooker is close to the probability, predicted based on the text feature of the text 1, that the target object described by the text 1 belongs to an electric pressure cooker; and the probability, predicted based on the image feature of the image 1, that the target object in the image 1 belongs to a heating lunch box is close to the probability, predicted based on the text feature of the text 1, that the target object described by the text 1 belongs to a heating lunch box. After the target model is updated based on the loss value 4, a classification result predicted based on an image feature next time may be closer to a classification result predicted based on a text feature. For example, after a plurality of rounds of iterative training, a current target model extracts an image feature (referred to as an image feature 100 below for differentiation) of an image (referred to as an image 100 below for differentiation) included in the hundredth sample and a text feature (referred to as a text feature 100 below for differentiation) of a text included in the hundredth sample. Because a plurality of rounds of iterative training have been performed, a classification result predicted based on an image feature may be closer to a classification result predicted based on a text feature. Therefore, a prediction result obtained this time may be as follows: It is predicted, based on the image feature 100, that a probability that a target object in the image 100 belongs to an electric rice cooker is 0.9, a probability that the target object belongs to an electric pressure cooker is 0, and a probability that the target object belongs to a heating lunch box is 0; and it is predicted, based on the text feature 100, that a probability that the target object described in the image 100 belongs to an electric rice cooker is 0.9, a probability that the described target object belongs to an electric pressure cooker is 0, and a probability that the described target object belongs to a heating lunch box is 0. In this example, the target model is updated based on the loss value 4, and is iteratively trained for a plurality of times, so that a classification result predicted based on an image feature is the same as a classification result predicted based on a text feature.

In a preferred implementation, in the solution provided in this disclosure, a bidirectional KL divergence may be used, so that a classification result predicted based on an image feature is closer to a classification result predicted based on a text feature. For example, the loss value 4 may be understood with reference to a formula 1-4:

$$J_4 = \frac{1}{2}[KL(\text{pred}_{img}, \text{pred}_{text}) + KL(\text{pred}_{text}, \text{pred}_{img})] \qquad (1\text{-}4)$$

where $\text{pred}_{img}$ represents a probability, predicted based on an image feature, that a product belongs to a target object in the object set, and $p_{text}$ represents a probability, predicted based on a text feature, that the described product belongs to the target object in the object set.

Therefore, based on the embodiment corresponding to FIG. 3, in a possible implementation, the target model may be updated based on the loss value 1 and the loss value 4, and a total loss is a sum of J1 and J4. It should be noted that any two possible implementations in the solution provided in this disclosure may be combined. Details are not described below again. For example, in a possible implementation, the target model may be updated based on the loss value 1, the loss value 2, and the loss value 4, and a total loss is a sum of J1, J2, and J4. In a possible implementation, the target model may be updated based on the loss value 1, the loss value 2, the loss value 3, and the loss value 4, and a total loss is a sum of J1, J2, the loss value 3, and J4.

To further improve performance of the target model, and further improve an image representation capability of an image feature extracted by the target model, a classification result predicted based on the image feature may be further made closer to a classification of a target object actually included in an image, and an object described by a classification result predicted based on a text feature may be further made closer to the classification of the target object actually included in the image. In a possible implementation, the method further includes: predicting, based on the image feature of the first image, the first probability that the target object in the first image belongs to each target object in the object set, where the object set includes the target objects included in all the images in the plurality of training samples; predicting, based on the text feature of the first text, the second probability that the first text describes each target object in the object set; obtaining a loss value 5 based on a difference between the first probability and a first preset value, where the first preset value indicates a preset probability that the target object in the first image belongs to each target object in the object set; and obtaining a loss value 6 based on a difference between the second probability and a second preset value, where the second preset value indicates a preset probability that the first text describes each target object in the object set. For example, it is assumed that the training samples include a training sample 1, a training sample 2, and a training sample 3. The training sample 1 includes an image 1 and a text 1, the training sample 2 includes an image 2 and a text 2, and the training sample 3 includes an image 3 and a text 3. The image 1 includes a target object brand A first-model electric rice cooker, and the text 1 is "brand A electric rice cooker, for household use, intelligent, mini 1.6 L, pressure electric rice cooker, single-person, small, for a dormitory". The image 2 includes a target object brand A second-model electric rice cooker, and the text 2 is "brand A electric rice cooker, 4 L, for household use, intelligent, multi-functional rice cooker, for five persons". The image 3 includes a target object brand C electric rice cooker, and the text 3 is "brand B small rice cooker, 1.6 L, electric rice cooker, intelligent mini electric rice cooker". In this case, the object set includes the brand A first-model electric rice cooker, the brand A second-model electric rice cooker, and the brand C electric rice cooker. It is assumed that the current target model extracts an image feature of the image and a text feature of the text that are included in the training sample 1, that is, extracts the image feature of the image 1 and the text feature of the text 1. It is assumed that it is predicted, based on the image feature of the image 1, that a probability that the target object in the image 1 belongs to the brand A first-model electric rice cooker is 0.6, a probability that the target object belongs to the brand A second-model electric rice cooker is 0, and a probability that the target object belongs to the brand C electric rice cooker is 0.4. It is assumed that it is predicted, based on the text feature of the text 1, that a probability that the target object in the text 1 belongs to the brand A first-model electric rice cooker is 0.7, a probability that the target object belongs to the brand A second-model electric rice cooker is 0, and a probability that the target object belongs to the brand C electric rice cooker is 0.3. Because the target object actually included in the image 1 is the brand A first-model electric rice cooker, for the sample 1, a preset probability that the target object in the image 1 belongs to the brand A first-model electric rice cooker is 1, a preset probability that the target object belongs to the brand A second-model electric rice cooker is 0, and a preset probability that the target object belongs to the brand C electric rice cooker is 0. In current training, the loss value 5 is obtained based on a difference between 0.6 and 1, a difference between 0 and 0, and a difference between 0.4 and 0. In current training, the loss value 6 is obtained based on a difference between 0.7 and 1, a difference between 0 and 0, and a difference between 0.3 and 0. An objective of updating the target model based on the loss value 5 and the loss value 6 is as follows: After a plurality of rounds of iterative training, a classification result predicted based on an image feature can be closer to a classification of a target object actually included in an image, and an object described by a classification result predicted based on a text feature can be closer to the classification of the target object actually included in the image. For example, after a plurality of rounds of iterative training, a current target model extracts an image feature (referred to as an image feature 100 below for differentiation) of an image (referred to as an image 100 below for differentiation) included in the hundredth sample and a text feature (referred to as a text feature 100 below for differentiation) of a text included in the hundredth sample. It is assumed that a target object actually included in the image 100 is a brand A first-model electric rice cooker. In this case, for the hundredth sample, a preset probability that the target object in the image 100 belongs to the brand A first-model electric rice cooker is 1, a preset probability that the target object belongs to a brand A second-model electric rice cooker is 0, and a preset probability that the target object belongs to a brand C electric rice cooker is 0. Because a plurality of rounds of iterative training have been performed, a classification result predicted based on an image feature can be closer to a classification of a target object actually included in an image, and an object described by a classification result predicted based on a text feature can be closer to the classification of the target object actually included in the image. A prediction result obtained this time may be as follows: It is predicted, based on the image feature 100, that a probability that the target object in the image 100 belongs to the brand A first-model electric rice cooker is 0.9, a probability that the target object belongs to the brand A second-model electric rice cooker is 0, and a probability that the target object belongs to the brand C electric rice cooker is 0.1; and it is predicted, based on the text feature 100, that a probability that the target object described in the image 100 belongs to the brand A first-model electric rice cooker is 0.9, a probability that the described target object belongs to the brand A second-model electric rice cooker is 0, and a probability that the described target object belongs to the brand C electric rice cooker is 0.1. In this example, the target model is updated based on the loss value 5 and the loss value 6, and is iteratively trained for a plurality of times, so that a classification result predicted based on an image feature is quite close to a classification of a target object actually included in an image, and an object described by a classification result predicted based on a text feature is also quite close to the classification of the target object actually included in the image. The loss value 5 and the loss value 6 may be cross entropy loss values or loss values of another type.

Therefore, in a possible implementation, the target model may be updated based on the loss value 1, the loss value 5, and the loss value 6, or the target model may be updated based on more than one of the loss values 1 to 4, the loss value 5, and the loss value 6. For example, the target model is updated based on the loss values 1 to 6.

To further improve performance of the target model, and further improve an image representation capability of an image feature extracted by the target model, a loss value 7 may be further introduced, so that image features of different products are sufficiently differentiated. In a possible implementation, the method further includes: obtaining a first distance between the first vector and a third vector, and obtaining a second distance between the first vector and a fourth vector, where the third vector indicates the image feature of the second image, the fourth vector indicates an image feature of a third image, and a target object included in the third image is different from that included in the first image. In this disclosure, sometimes, obtaining a distance between two vectors is also referred to as obtaining a distance between two image features. The two expressions represent a same meaning. In addition, an image feature may be considered as a vector. The loss value 7 is obtained based on a difference between a preset threshold and a difference between the first distance and the second distance. For example, it is assumed that a feature distance (namely, a vector distance) between two different images a and p of a same commodity is d1, and a feature distance (namely, a vector distance) between images a and n of different commodities is d2. A purpose of updating the model based on the loss value 7 is to make d2−d1>m, where m is the preset threshold, that is, a feature distance d1 between images of a same commodity is smaller, and a feature distance d2 between images of different commodities is larger. For example, the loss value 7 $J_5$ may be understood with reference to a formula 1-5:

$$J_5 = \sum_{i}^{N} [\|f(x_i^a) - f(x_i^p)\|_2^2 - \|f(x_i^a) - f(x_i^n)\|_2^2 + m]_+ \tag{1-5}$$

where $$f(x_i^a)$$

represents an image feature of an image in a current to-be-processed sample, $$f(x_i^p)$$

represents an image feature of an image that includes a same product as the image in the current to-be-processed sample, $$f(x_i^n)$$

represents an image feature of an image that includes a different product from the image in the current to-be-processed sample, and m represents the preset threshold.

In a possible implementation, the target model may be updated based on the loss value 1 and the loss value 7, or the target model may be updated based on more than one of the loss values 1 to 6, and the loss value 7. For example, the target model is updated based on the loss values 1 to 7.

To deepen guidance of using a text feature for extracting an image feature by the target model, during prediction of a plurality of attributes of a target object included in an image, a keyword in a text is used as a preset tag to perform multi-class supervision. In a possible implementation, the method further includes: predicting at least one attribute of the target object in the first image based on the image feature of the first image; and obtaining a loss value 8 based on a difference between the at least one attribute and a preset tag, where the preset tag is obtained through word segmentation preprocessing performed on the first text. In a possible implementation, word segmentation preprocessing includes a word segmentation operation and a word frequency analysis operation. Specifically, word segmentation processing may be performed in advance on each text included in each training sample, to obtain a plurality of candidate keywords, and then a word frequency analysis operation is performed on the plurality of candidate keywords, to obtain a candidate keyword that can best represent a target object attribute, as a final keyword. The final keyword is used as a preset tag. For example, it is assumed that candidate keywords "brand A", "electric rice cooker", "for household use", "intelligent", "mini", "1.6 L", "pressure", "electric rice cooker", "single-person", "small", and "dormitory" are obtained through word segmentation processing performed on the text "brand A electric rice cooker, for household use, intelligent, mini 1.6 L, pressure electric rice cooker, single-person, small, for a dormitory". Through a word frequency analysis operation performed on these candidate keywords, a final keyword may be selected from the candidate keywords. It is assumed that final keywords include "brand A", "electric rice cooker", "mini", "small", "1.6 L", and "electric rice cooker". When these final keywords are used as a preset tag, and an attribute of the target object described by the text is predicted based on the image feature, a prediction result (at least one attribute) should be close to the preset tag as much as possible. After the loss value 8 is obtained based on the difference between the at least one attribute and the preset tag, and a plurality of rounds of iterative training are performed on the target model based on the loss value 8, a prediction result (at least one attribute) can be closer to the preset tag when the target model performs, based on the image feature, attribute prediction on the target object described by the text.

In a possible implementation, the target model may be updated based on the loss value 1 and the loss value 8. In a possible implementation, the target model may be updated based on the loss value 1, the loss value 2, and the loss value 8. In a possible implementation, the target model may be updated based on the loss value 1, the loss value 2, the loss value 3, and the loss value 8. In a possible implementation, the target model may be updated based on the loss value 1, the loss value 2, the loss value 3, the loss value 4, and the loss value 8. In a possible implementation, the target model may be updated based on the loss value 1, the loss value 2, the loss value 3, the loss value 4, the loss value 5, the loss value 6, and the loss value 8. In a possible implementation, the target model may be updated based on the loss value 1, the loss value 2, the loss value 3, the loss value 4, the loss value 5, the loss value 6, the loss value 7, and the loss value 8.

Figure 4:
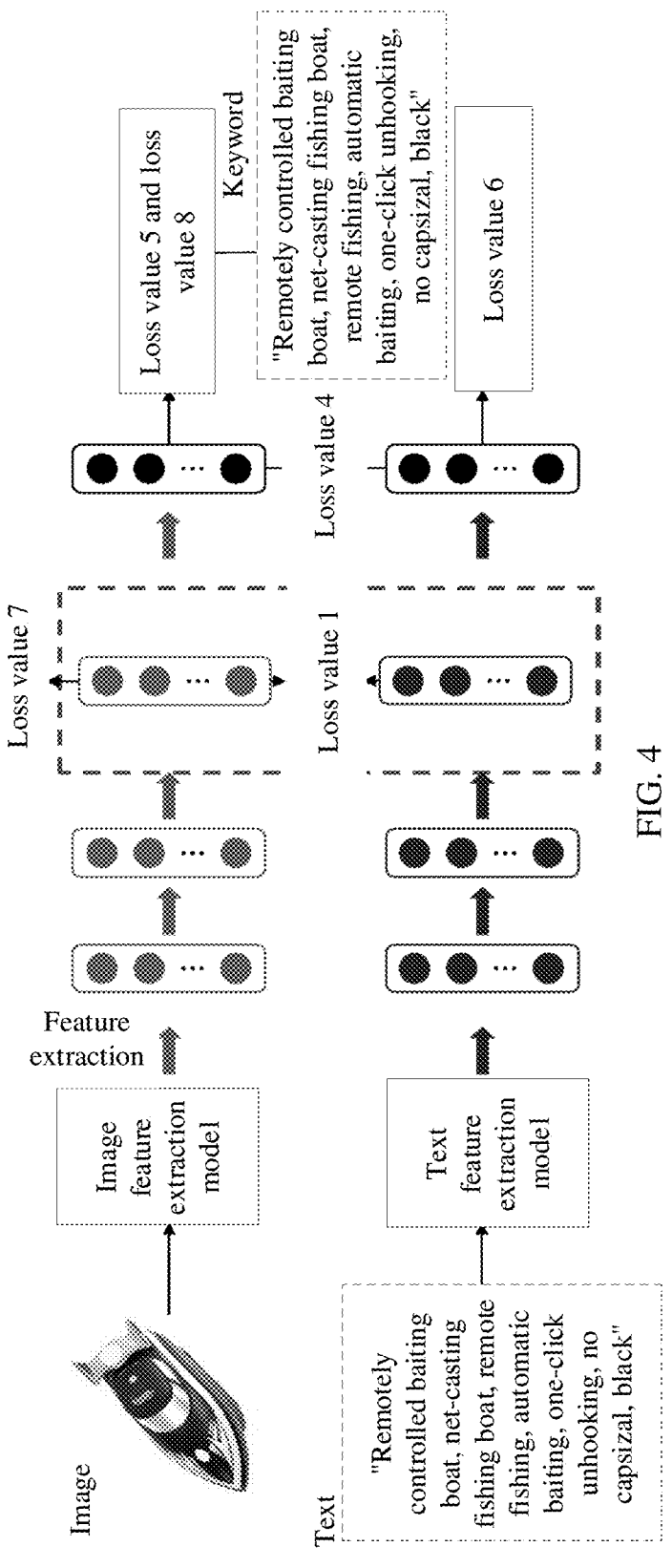
FIG. 4 is a schematic diagram of an execution procedure of a target model according to an embodiment of this disclosure.

To better understand the solutions provided in this disclosure, the following sorts, with reference to an embodiment, an embodiment optimized based on the embodiment corresponding to FIG. 3. FIG. 4 is a schematic diagram of another execution procedure of a target model according to an embodiment of this disclosure. The target module may include two feature extraction modules, which are respectively configured to extract an image feature of an image in a training sample and a text feature of a text in the training sample. A difference between an image feature and a text feature is reduced in homogeneous space. This may be understood with reference to the loss value 1. Image features of a same product are closer to each other, and text features of a same product are closer to each other. This may be understood with reference to the loss value 2 and the loss value 3. A classification result predicted based on an image feature is closer to a classification result predicted based on a text feature. This may be understood with reference to the loss value 4. A classification result predicted based on an image feature is closer to a classification of a target object actually included in an image, and an object described by a classification result predicted based on a text feature is closer to the classification of the target object actually included in the image. This may be understood with reference to the loss value 5 and the loss value 6. Image features of different products are sufficiently differentiated. This may be understood with reference to the loss value 7. During prediction of a plurality of attributes of a target object included in an image, multi-class supervision is performed by using a keyword in a text as a preset tag, and the loss value 8 is obtained based on a difference between at least one attribute and the preset tag. A total loss value is obtained based on a sum of the loss values 1 to 8, and the target model is updated based on the total loss value.

It can be learned from the embodiment corresponding to FIG. 3 and the another embodiment optimized based on the embodiment corresponding to FIG. 3 that, in the solutions provided in this disclosure, image feature learning is guided by using a text feature, so as to improve an image representation capability of an image feature extracted by using a target model. In addition, a keyword may be obtained by preprocessing a text, and during prediction of a plurality of attributes of a target object included in an image, multi-class supervision is performed by using the keyword in the text as a preset tag, thereby further improving a representation capability of an image feature. As a representation capability of an image feature is improved, the image feature can represent a feature of an image more accurately, thereby helping improve precision of image retrieval performed based on the image feature.

According to the embodiment corresponding to FIG. 3, the plurality of training samples may be obtained in a plurality of manners in the solutions provided in this disclosure. In a solution in which the plurality of training samples are obtained by using a crawler tool to crawl an Internet web page including shopping information, there may be a problem of large noise, and a problem that a training sample set is unbalanced may be further caused. These are described in the descriptions of the research idea, and details are not described herein again. The following describes, with reference to a specific embodiment, how to resolve these problems.

Figure 5:
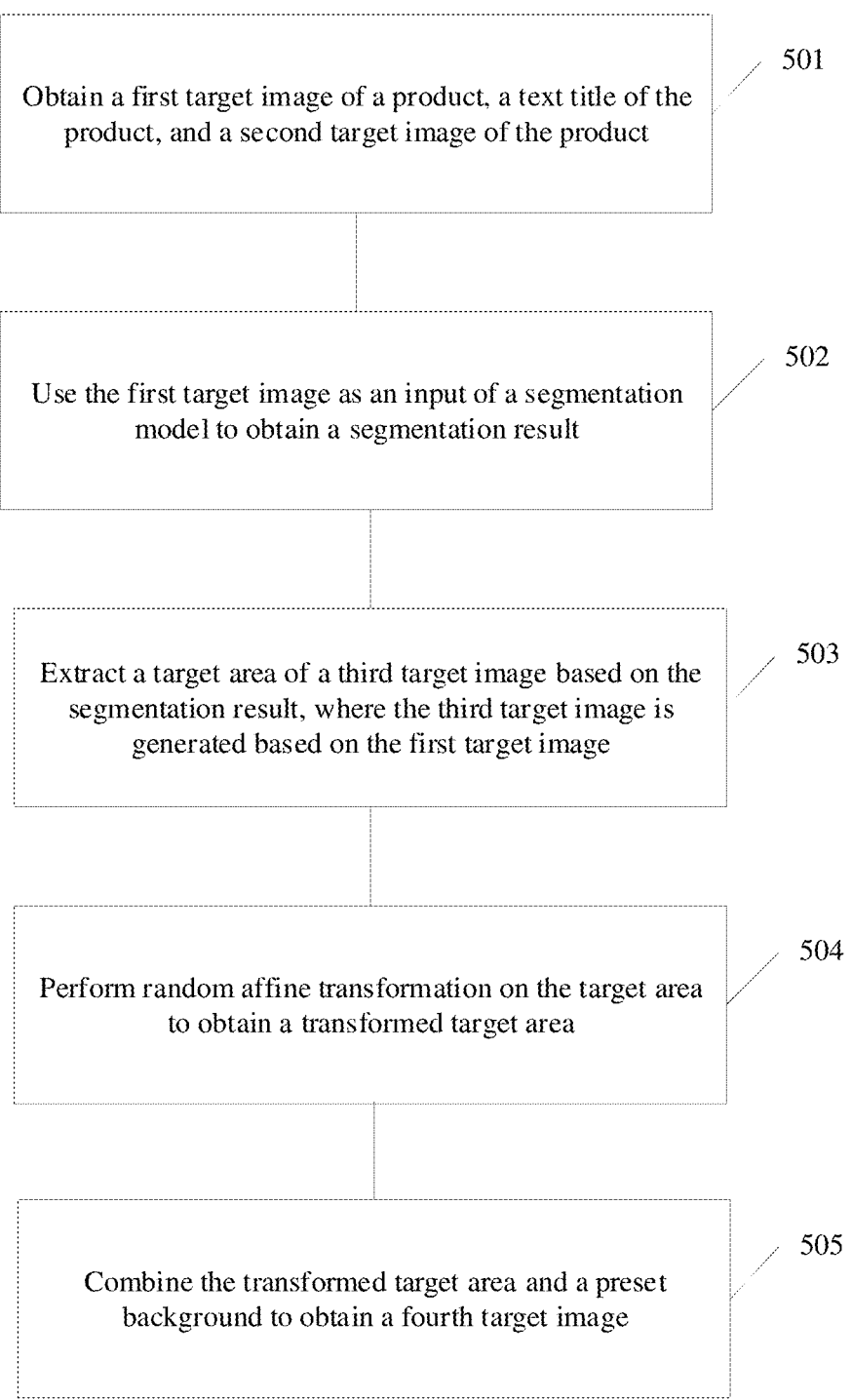
FIG. 5 is a schematic flowchart of obtaining a balanced training sample set according to an embodiment of this disclosure.

Referring to FIG. 5, in this embodiment of this disclosure, a balanced training sample set may be obtained by using the following method. Specifically, as shown in FIG. 5, the method may include the following steps.

501: Obtain a first target image of a product, a text title of the product, and a second target image of the product.

The first target image comes from a provider of the product, and the second target image comes from a buyer of the product. In other words, the first target image may be understood as a buyer show of the product, and the second target image may be understood as a seller show. The text title of the product may be understood as a product title that is set by a seller, for example, "brand A electric rice cooker, for household use, intelligent, mini 1.6 L, pressure electric rice cooker, single-person, small, for a dormitory".

502: Use the first target image as an input of a segmentation model to obtain a segmentation result.

Foreground and background classification is performed on each pixel in the image to determine a category of each pixel, so as to divide a foreground main area.

A person skilled in the art may select different segmentation models based on requirements to perform segmentation processing on the first target image, to obtain the segmentation result. In a preferred implementation, the segmentation model is Deeplab V3. The segmentation result may indicate a contour of the product in the first target image. It should be noted that, because a seller show usually has a simple background, a comparatively good segmentation effect can be achieved through segmentation processing performed on the seller show by using a general segmentation model. In other words, the segmentation model used in this disclosure does not need to be trained by using a large quantity of real seller shows as training data. The segmentation model used in this disclosure may be a segmentation model obtained through training performed by using another type of training data.

503: Extract a target area of a third target image based on the segmentation result, where the third target image is generated based on the first target image.

Figure 6:
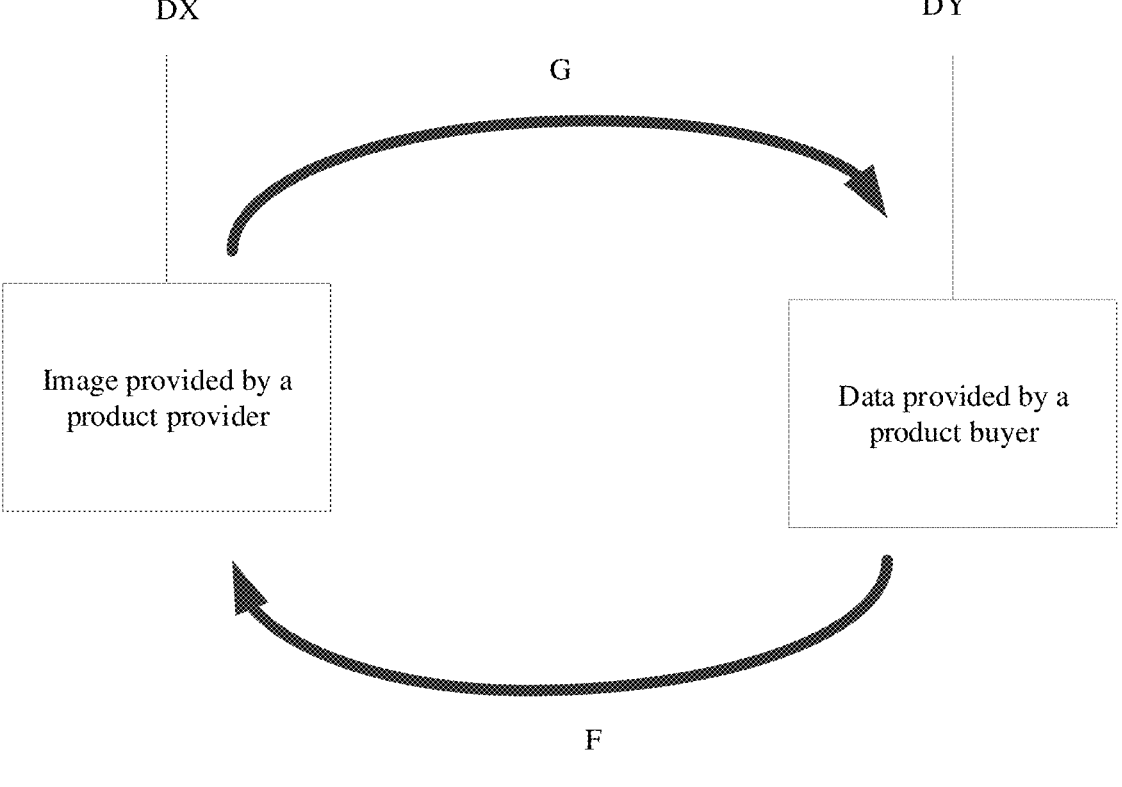
FIG. 6 is a schematic diagram of a structure of a cycle generative adversarial network.

The third target image may be generated based on the first target image. The first target image may be considered as one piece of data in source domain data, and the third target image may be considered as one piece of data in target domain data. A person skilled in the art may generate the target domain data based on the source domain data in different manners based on requirements. For example, in a possible implementation, referring to FIG. 6, a cycle generative adversarial network (cycle-GAN) is trained by using an image (source domain data) provided by a provider of a product and an image (target domain data) provided by a buyer of the product. The cycle-GAN includes two generators (G and F) and two discriminators (DX and DY). The generator G generates target domain data based on the source domain data, and the discriminator DX needs to determine whether input data is real target domain data or the target domain data generated based on the source domain data. The generator F generates source domain data based on the generated target domain data, and the discriminator DY needs to determine whether input data is real source domain data or the generated source domain data. Through adversarial training, the generator G needs to deceive the discriminator DX as much as possible, and the generator F needs to deceive the discriminator DY as much as possible. When the discriminators DX and DY are no longer capable of distinguishing between true and false, it may be considered that training is completed. In this case, real source domain data is input into the generator G, and the generator G may generate target domain data based on the input real source domain data. In the solution provided in this disclosure, the first target image is input into the generator G, and the generator G can generate the third target image based on the first target image. Referring to FIG. 7, an area in which a target object in the third target image is located may be extracted from the third target image based on a contour of the target object.

504: Perform random affine transformation on the target area to obtain a transformed target area.

To increase diversity of the generated third target image, random affine transformation may be performed on the target area. Through random affine transformation performed on the target area, a buyer show closer to a real situation can also be obtained. For example, different users may photograph a same product at different angles and in different photographing environments. Through random affine transformation performed on the target area, a difference between photographing angles of buyer shows can be simulated. Performing random affine transformation on the target area may be understood as performing operations such as rotation and translation on the target area.

505: Combine the transformed target area and a preset background to obtain a fourth target image.

The preset background may be a background area extracted from another buyer show or a randomly collected background area. The fourth target image is obtained by combining the preset background area and the transformed target area.

In a possible implementation, the method further includes: obtaining a first-type training sample, a second-type training sample, and a third-type training sample, where each first-type training sample includes the first target image and the text title, each second-type training sample includes the second target image and the text title, and each third-type training sample includes the fourth target image and the text title.

In a possible implementation, the training sample obtained according to the embodiment corresponding to FIG. 5 may alternatively include only an image and no text. To be specific, each first-type training sample includes an image provided by the buyer of the product, an image provided by the provider of the product, and an image generated based on the image provided by the provider of the product according to the solution described in FIG. 5. These pieces of image data are used as training data to train an existing image feature extraction model, to perform a subsequent image retrieval task, and image precision can also be improved. This is described below by using experimental data.

According to the solution in the embodiment corresponding to FIG. 5, in absence of a buyer show, a large amount of buyer-show data is generated by using a seller show, so that a trained target model has specific robustness for a complex buyer-show image style, and retrieval difficulty caused by a large change of a photographing angle of a user can be alleviated to a specific extent.

It should be noted that the embodiment corresponding to FIG. 5 may serve as an independent embodiment, or may be combined with the embodiment corresponding to FIG. 3. For example, the first-type training sample, the second-type training sample, and the third-type training sample that are obtained in the embodiment corresponding to FIG. 5 are used as the plurality of training samples in the embodiment corresponding to FIG. 3.

In addition, to not only improve image retrieval precision but also improve an image retrieval speed and reduce a requirement on a storage capability of an image database, the solutions provided in this disclosure provide an end-toend design, to perform joint optimization on a hash feature and an inverted codebook. This is described below with reference to a specific embodiment.

FIG. 7 is a schematic flowchart of a model training method according to an embodiment of this disclosure.

As shown in FIG. 7, the model training method provided in this embodiment of this disclosure may include the following steps.

701: Perform a plurality of times of training on a hash model based on a plurality of image features extracted by a target model, to obtain a trained hash model, where any one of the plurality of times of training includes step 7011 to step 7015.

The target model may be understood with reference to the target model described in the embodiment corresponding to FIG. 3. Details are not described herein again.

In some possible implementations, the target model may be a trained target model, for example, the target model has been trained for a preset quantity of times, or the target model has been converged. In some possible implementations, the target model may alternatively be a target model for which training is not yet completed.

7011: Obtain a hash feature corresponding to each image feature.

The image features extracted by the target model are used as an input of the hash model, so that the hash model outputs hash features corresponding to the image features.

7012: Perform clustering processing on the plurality of hash features, to obtain a plurality of clustered datasets.

For example, the plurality of hash features are divided into different groups based on magnitudes of the plurality of hash features, so that magnitudes of hash features included in each group are similar. Each of the plurality of clustered datasets corresponds to one cluster center. The cluster center may be understood as an average value of all hash features included in one clustered dataset. A set of all cluster centers of all clustered datasets is referred to as an inverted codebook.

7013: Obtain a first hash feature from the plurality of hash features, and obtain a first clustered dataset from the plurality of clustered datasets based on a similarity between a cluster center of each clustered dataset and the first hash feature.

The first hash feature is any one of the plurality of hash features. A similarity between a cluster center of the first clustered dataset and the first hash feature is highest in the plurality of clustered datasets.

7014: Obtain a loss value 9 based on a difference between the cluster center of the first clustered dataset and the first hash feature.

7015: Update the hash model based on the loss value 9.

To optimize both the inverted codebook and the hash model, the loss value 9 is introduced in this disclosure to perform iterative training on the hash model. It is assumed that currently the $r^{th}$ time of iterative training is being performed on the hash model. Hash feature extraction is performed on the image features based on a hash model obtained through the $(r-1)^{th}$ round of iteration, a plurality of clustered datasets are obtained in a clustering manner, and an inverted codebook C is obtained based on a set of cluster centers of the plurality of clustered datasets. A cluster center of each clustered dataset is calculated. A loss value is obtained based on a difference between a hash feature of the $i^{th}$ sample and the cluster center of the first clustered dataset, and the hash model is updated based on the loss value, so as to obtain a hash model obtained through the $r^{th}$ time of iterative training. For example, the loss value 9 $L_C$ may be understood with reference to a formula 1-6:

$$L_C=\|u_i-c_{i*}\|_2 \qquad (1\text{-}6)$$

where $u_i$ represents the hash feature of the $i^{th}$ sample, and $c_i$ represents a cluster center closest to $u_i$.

When the hash model is converged, or a quantity of times of training reaches a preset quantity, an optimized hash feature model and an optimized inverted codebook can be obtained. In the solution provided in this disclosure, the hash model and the inverted codebook are jointly optimized, and end-to-end training is performed on the inverted codebook and the hash feature. According to the solution provided in this disclosure, during execution of an image retrieval task, a hash feature of an image is obtained, a cluster center with a highest similarity to the hash feature is searched for from the inverted codebook based on the hash feature of the image, and a clustered dataset corresponding to the one or more cluster centers with a highest similarity is obtained, thereby increasing a probability that a same product included in the input image is found from hash features included in the clustered dataset, so that image retrieval precision is improved.

In addition, in step 7011, it is mentioned that the image features extracted by the target model are used as the input of the hash model, so that the hash model outputs the hash features corresponding to the image features. In a possible implementation, iterative training is performed on the hash model, so that the image feature is represented by using a binary vector (it is assumed that the binary vector includes a third preset value and a fourth preset value). To achieve this objective, a loss value 10 is introduced in this disclosure. The loss value 10 $L_f$ may be understood with reference to a formula 1-7. An image database stores a binary vector of each image, so that a requirement on a storage capability of the image database can be reduced to a specific extent. In addition, in a possible implementation, quantities of third preset values and fourth preset values in the binary vector should be balanced, so that the binary vector can represent more information. This is because an amount of represented information is small when all values in the binary vector are third preset values or fourth preset values. To achieve this objective, a first constraint is introduced in this disclosure. The first constraint $L_b$ may be understood with reference to a formula 1-8. In addition, in a possible implementation, a value of each dimension in the binary vector should be independent, so that the binary vector can carry more information. To achieve this objective, a second constraint is introduced in this disclosure. The second constraint $L_i$ may be understood with reference to a formula 1-9.

With reference to the foregoing analysis, in a possible implementation, any one time of training of the hash model includes:

applying the first constraint and the second constraint to a target hash feature, to obtain an updated target hash feature, where the target hash feature is a hash feature obtained based on a last updated hash model, the first constraint is that quantities of third preset values and fourth preset values in the hash feature are average, the second constraint is that an element on a first diagonal of a target matrix is the fourth preset value and an element other than the first diagonal in the target matrix is the third preset value, an element in the $i^{th}$ row and the $j^{th}$ column in the target matrix represents an average value of a plurality of target elements, the plurality of target elements represent products of values of the $i^{th}$ dimension of the hash features and values of the $j^{th}$ dimension of the hash features, and i and j are positive integers; comparing a value of each dimension of the target hash feature and a second mean, where the second mean is an average value of the third preset value and the fourth preset value; and when the value of each dimension is less than the second mean, obtaining the loss value 10 based on a difference between the value of each dimension of the hash feature and the third preset value; or when the value of each dimension is not less than the second mean, obtaining the loss value 10 based on a difference between the value of each dimension of the hash feature and the fourth preset value, where $$L_f = \frac{1}{n}\sum_{i=1}^{n}\sum_{j=1}^{L}[1(u_{ij} \geq 0.5)(1 - u_{ij})^a \cdot \qquad (1\text{-}7)$$

$$\log(u_{ij}) + 1(u_{ij} < 0.5)(u_{ij})^a \cdot \log(1 - u_{ij})]$$

where n represents a total quantity of training samples; L represents a length of a hash feature (for example, 1024 bits), and may also be referred to as a length of a binary vector; a represents a preset parameter; and $u_{ij}$ represents the $j^{th}$ dimension of a hash feature of the $i^{th}$ sample;

$$L_b = \|U^T 1\|_1 \qquad (1\text{-}8)$$

where U represents a hash feature output by the hash model; and $$L_i = \|U^T U - I\|_F \qquad (1\text{-}9)$$

where U represents a hash feature output by the hash model, I represents a matrix in which an element on a diagonal is the fourth preset value and an element other than that on the diagonal is the third preset value, one end of the diagonal is an element in the first row and the first column, and the other end of the diagonal is an element in the last row and the last column.

It is mentioned above that the target model may be a trained target model, for example, a preset quantity of times of training has been completed, or the target model has been converged. Alternatively, the target model may be a target model for which training is not yet completed. In a possible implementation, if the target model is a trained target model, the target model is no longer updated when the hash model is updated based on the loss value 9 and the loss value 10. In a possible implementation, if the target model is not a trained target model, when the hash model is updated based on the loss value 9 and the loss value 10, the target model also needs to be updated based on the loss value 9 and the loss value 10. For example, the target model is updated based on the loss values 1 to 10. In addition, when the hash model is updated based on the loss value 9 and the loss value 10, one or more of the loss values 1 to 8 may also be used to update the hash model.

Figure 8:
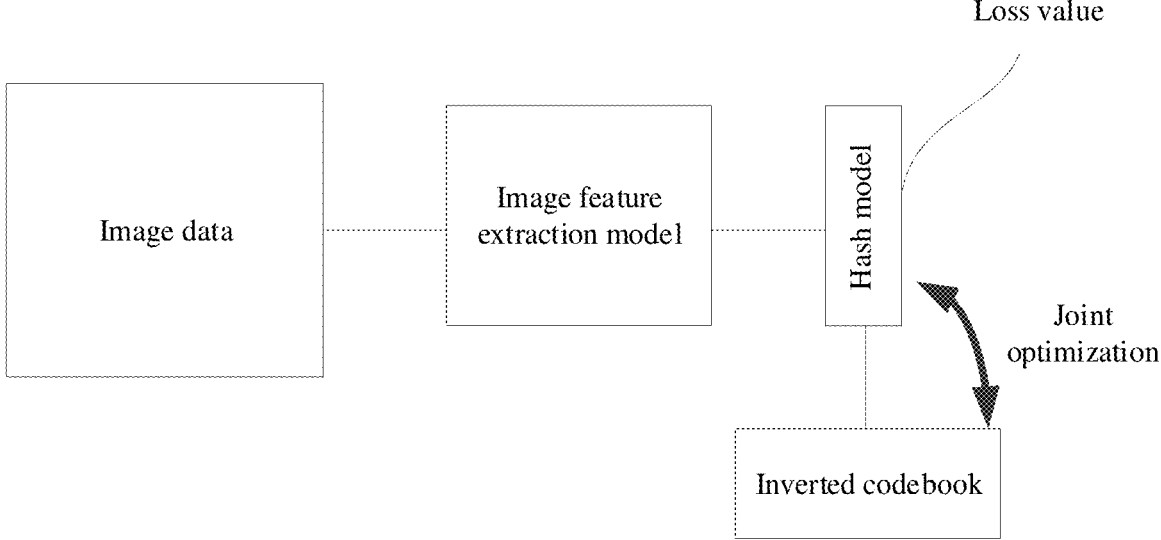
FIG. 8 is a schematic diagram of another execution procedure of a target model according to an embodiment of this disclosure.

It should be noted that the embodiment corresponding to FIG. 7 may be combined with another embodiment, or may not be combined with another embodiment, but serve as an independent embodiment. The following provides descriptions with reference to FIG. 8. FIG. 8 is a schematic flowchart of a model training method according to an embodiment of this disclosure. In this implementation, the embodiment corresponding to FIG. 7 may not be combined with the embodiment corresponding to FIG. 3, and image feature learning is not guided by using a text feature. In this implementation, an input of a target model includes only an image, and the target model extracts only an image feature of the image. An image feature output by the target model is used as an input of a hash model, so that the hash model converts the image feature into a binary vector of a preset dimension. In a process of training the hash model based on the image feature, joint optimization is further performed on an inverted codebook. How to optimize both the inverted codebook and the hash model has been described in the foregoing embodiment corresponding to FIG. 7. Details are not described herein again. This may also be understood with reference to FIG. 8. In addition, in a process of training the hash model, the loss value 10, the first constraint, and the second constraint are also considered. Details are not described herein again. In this implementation, to improve an image representation capability of a hash feature that is of an image and that is extracted by the hash model, hash features of different products may be further made sufficiently differentiated. Herein, this may be understood with reference to the loss value 7, that is, understood with reference to descriptions of making different image features sufficiently differentiated, where the image feature in the related descriptions of the loss value 7 merely needs to be replaced with the hash feature. In addition, to further improve an image representation capability of a hash feature extracted by the target model, a classification result predicted based on the hash feature may be further made closer to a classification of a target object actually included in an image, and an object described by a classification result predicted based on a text feature may be further made closer to the classification of the target object actually included in the image. Herein, this may be understood with reference to the loss value 5 and the loss value 6. Details are not described herein again. That is, the image feature in the related descriptions of the loss value 5 and the loss value 6 merely needs to be replaced with the hash feature.

Figure 9:
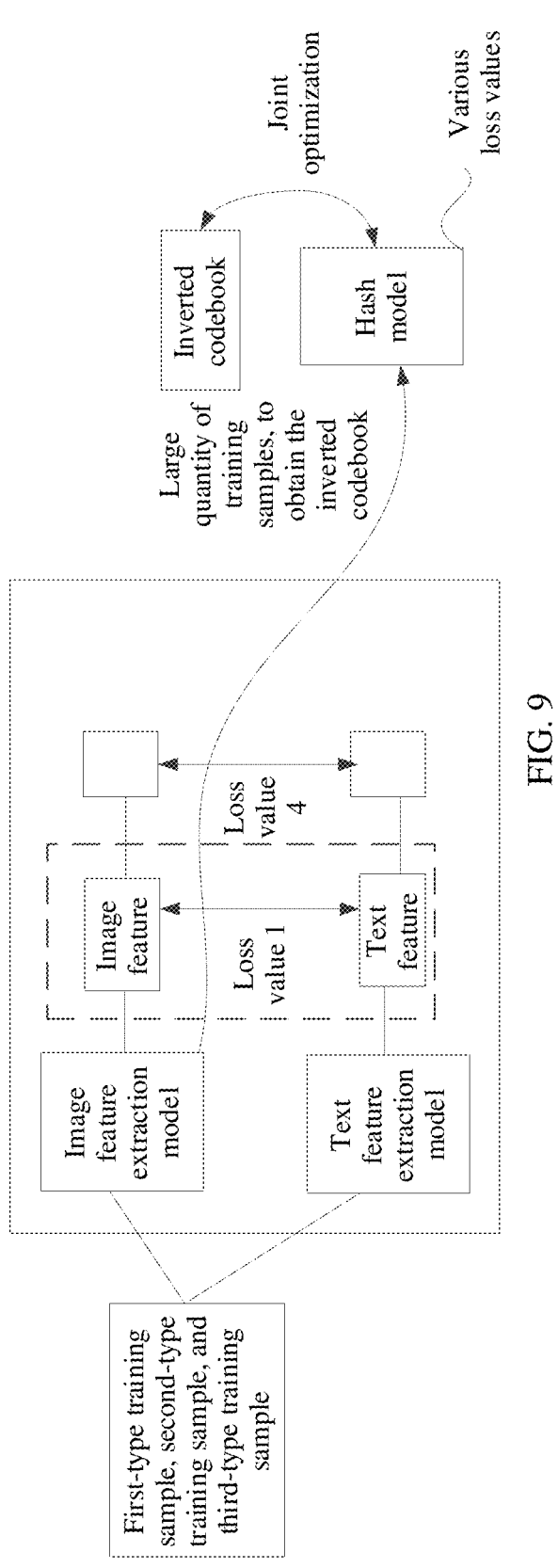
FIG. 9 is a schematic diagram of another execution procedure of a target model according to an embodiment of this disclosure.

In addition, there may be a plurality of manners of combining the embodiments. The following provides descriptions with reference to FIG. 9. FIG. 9 is a schematic flowchart of a model training method according to an embodiment of this disclosure. In this implementation, the implementation corresponding to FIG. 6 may be combined with the embodiment corresponding to FIG. 3, and combined with the embodiment corresponding to FIG. 5. As shown in FIG. 9, the first-type training sample, the second-type training sample, and the third-type training sample that are obtained according to the method described in FIG. 5 may be used as an input of the target model. In this implementation, the target model and the hash model may be synchronously trained. During one time of iterative training, the target model may extract a text feature and an image feature of a training sample, and obtain the loss value 1, the loss value 2, the loss value 3, and the loss value 4; and the image feature extracted by the target model is used as an input of the hash model, so that the hash model converts the image feature into a binary vector (namely, a hash feature) of a preset dimension. In addition, in a process of training the hash model, the loss value 10, the first constraint, and the second constraint are also considered. In this implementation, a classification loss and a triplet loss are obtained by using a hash feature. The classification loss makes hash features of different products sufficiently differentiated. Herein, this may be understood with reference to the loss value 7, that is, understood with reference to descriptions of making different image features sufficiently differentiated, where the image feature in the related descriptions of the loss value 7 merely needs to be replaced with the hash feature. The triplet loss makes a classification result predicted based on a hash feature closer to a classification of a target object actually included in an image, and may further make an object described by a classification result predicted based on a text feature closer to the classification of the target object actually included in the image. Herein, this may be understood with reference to the loss value 5 and the loss value 6. Details are not described herein again. That is, the image feature in the related descriptions of the loss value 5 and the loss value 6 merely needs to be replaced with the hash feature. A keyword in a text may be further used as a preset tag to perform multi-class supervision. In a possible implementation, at least one attribute of the target object in the first image is predicted based on a hash feature of the first image. A loss value is obtained based on a difference between the at least one attribute and the preset tag. This may be understood with reference to the loss value 8, where the image feature merely needs to be replaced with the hash feature.

The foregoing describes how to train a model, and the following describes how to perform an image retrieval task by using a trained model.

(2) Performing an Image Retrieval Task by Using a Trained Model

Figures 10, 11:
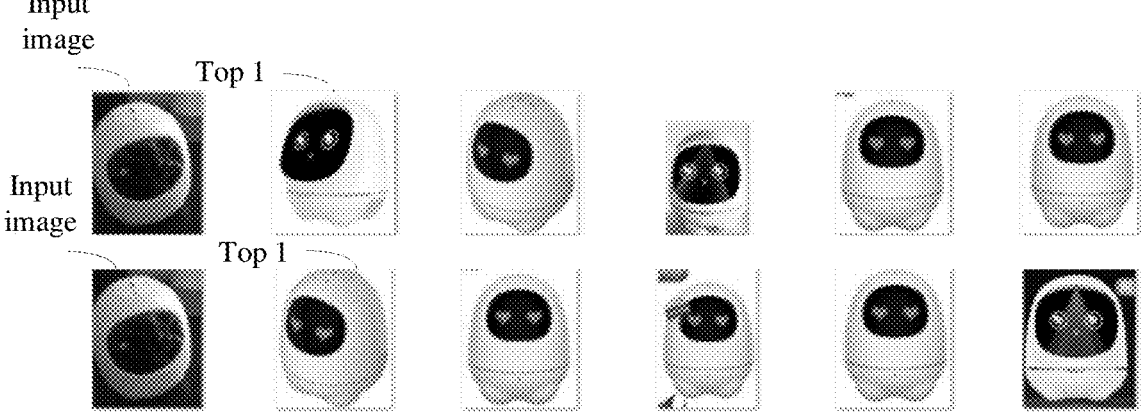
FIG. 10 is a schematic flowchart of an image retrieval method according to an embodiment of this disclosure.
FIG. 11 is a schematic diagram of an application scenario of a solution according to an embodiment of this disclosure.

FIG. 10 is a schematic flowchart of an image retrieval method according to an embodiment of this disclosure.

As shown in FIG. 10, the image retrieval method provided in this embodiment of this disclosure may include the following steps.

1001: Obtain a to-be-retrieved image.

The solution provided in this disclosure may be applicable to a scenario in which product retrieval is performed through photographing. Specifically, a user photographs a product by using a terminal device such as a mobile phone, to perform image retrieval. In the solution provided in this disclosure, the to-be-retrieved image may be obtained by using the terminal device.

1002: Extract an image feature of the to-be-retrieved image by using a target model.

The image feature of the to-be-retrieved image is extracted by using the target model obtained through training according to the model training method described in FIG. 3. The training method of the target model may be understood with reference to the embodiment corresponding to FIG. 3. Details are not described herein again.

1003: Obtain a predicted image from an image database based on the image feature of the to-be-retrieved image.

A similarity between an image feature of the predicted image and the image feature of the to-be-retrieved image reaches a threshold. To be specific, a purpose of retrieval is to obtain a product that is the same as or similar to a product included in the to-be-retrieved image. According to the solution provided in this embodiment of this disclosure, more obtained products are the same product. The image database stores a large quantity of image features or hash features. The image features or hash features stored in the image database come from images provided by product providers. Specifically, the images provided by the product providers are input into the target model, to obtain an image feature of an image provided by a provider of each product. The image database stores the image features of the images provided by the providers of all products. The image features output by the target model may be used as an input of a hash model, to output a hash feature corresponding to each image feature. In this way, the hash features of the images provided by the providers of all the products can be obtained. The image database includes the hash features of the images provided by the providers of all the products. A training process of the hash model is described above, and details are not described herein again. When the image database stores the image features of the images, the predicted image is obtained from the image database based on the image feature that is of the to-be-retrieved image and that is extracted from the target model. When the image database stores the hash features of the images, the image feature output by the target model further needs to be input into the hash model to obtain a hash feature of the to-be-retrieved image, and the predicted image is obtained from the image database based on the hash feature of the to-be-retrieved image.

According to the image retrieval method provided in this embodiment of this disclosure, image retrieval precision and an image retrieval speed can be effectively improved.

When an image retrieval task is performed according to the solution provided in this disclosure, image retrieval precision and an image retrieval speed can be significantly improved, and a requirement on a storage capability of an image database is reduced without reducing image retrieval precision. The following presents, with reference to several groups of experimental data, performance of the solution provided in this disclosure. Referring to Table 1, in an experiment process, testing is performed for two types of products: ornaments and toys. A product quantity represents a total quantity of products included in a test data set. A query quantity represents a total quantity of images provided by buyers of the products in the test data set. A base quantity represents a total quantity of images provided by providers of the products in the test data set.

TABLE 1

| Test set | Product quantity | Query quantity | Base quantity |
|---|---|---|---|
| Ornaments-test data set 1 | 203 | 691 | 754 |
| Ornaments-test data set 2 | 800 | 4179 | 5634 |
| Toys-test data set 3 | 206 | 1110 | 1462 |
| Toys-test data set 1 | 541 | 2784 | 3813 |

Table 2 shows a top 1 precision test indicator (the top 1 precision test indicator is precision of a retrieved product with highest confidence) obtained through execution of an image retrieval task performed after an existing image extraction model is trained by using, as training samples, a training sample set obtained according to the solution corresponding to FIG. 5 in this disclosure (a case in which the training sample includes only an image but no text). A large amount of buyer-show data is generated by using a seller show, so that a trained target model has specific robustness for a complex buyer-show image style, and retrieval difficulty caused by a large change of a photographing angle of a user can be alleviated to a specific extent. Therefore, compared with a conventional solution, in the solution provided in this disclosure, image retrieval precision for both an ornament category and a toy category is significantly improved, where precision for the ornament category is significantly improved, and precision in a comparatively large-scale test set of ornaments is improved by 4.58%. A higher top 1 indicator indicates higher retrieval precision. Top 1 precision indicates whether a result with highest confidence in retrieval results and a queried image correspond to a same commodity. If there are a total of 10 queried images, and highest-confidence retrieval results of eight queried images correspond to same products as the queried images, top 1 precision is 8/10=80%.

TABLE 2

| Method | Ornaments-test data set 1 | Ornaments-test data set 2 | Toys-test data set 3 | Toys-test data set 4 |
|---|---|---|---|---|
| Conventional solution | 87.93 | 64.34 | 88.10 | 74.72 |
| This solution | 90.72 (+2.79) | 68.92 (+4.5) | 89.53 (+1.43) | 75.21 (+0.49) |

FIG. 11 is a schematic diagram of a list of same products returned after an image retrieval task is performed by using a conventional solution, and same products returned after an image retrieval task is performed by using this solution. The first product (a retrieved product with highest confidence) in a list according to the solution provided in this disclosure is a same product as an input product, and a retrieved product with highest confidence according to the conventional solution is not a same product as an input product.

Table 3 presents top 1 precision test indicator gains for the two commodity categories, namely, ornaments and toys, after image feature learning is guided by using a text feature according to the solution provided in this disclosure. In a conventional method, only image data is used to train a model. In the method in the present invention, image feature learning is guided by using a text feature in a model training process. Compared with the conventional method, after image feature learning is guided by using a text feature, precision for the ornament and toy categories is significantly improved, where precision is respectively improved by 1.57% and 0.53% in two comparatively large-scale test sets. On this basis, in the solution provided in this disclosure, a solution of performing multi-class supervision by using a keyword in a text as a preset tag is further tested for ornaments, where model precision for ornaments is improved more greatly, and is finally improved by 2.77% compared with the conventional method.

sional 32-bit floating-point-number image feature is compressed into a 1024-dimensional binary hash feature), and reduction of retrieval precision is limited within 2%. Therefore, not only retrieval precision is ensured, but also a requirement on a storage space of an image database is greatly reduced. In addition, a retrieval time of a single queried image in a retrieval task for a base of billions of products is approximately 50 ms, ensuring real-time quality of image retrieval.

TABLE 4

| Product category | Data type | Top 1 precision test indicator | Product category | Model | Top 1 precision test indicator |
|---|---|---|---|---|---|
| Toys | Floating point | 91.36 | Food | Floating point | 98.71 |
| | Deep hash | 91.88 | | Deep hash | 98.71 |
| Ornaments | Floating point | 77.32 | Cosmetics | Floating point | 93.28 |
| | Deep hash | 80.24 | | Deep hash | 91.91 |
| Suitcases and bags | Floating point | 96.36 | Digital | Floating point | 69.38 |
| | Deep hash | 96.35 | products | Deep hash | 68.17 |
| Shoes | Floating point | 76.58 | Household | Floating point | 76.97 |
| | Deep hash | 78.22 | | Deep hash | 75.86 |

TABLE 3

| Method | Ornaments-test data set 1 | Ornaments-test data set 2 | Toys-test data set 3 | Toys-test data set 4 |
|---|---|---|---|---|
| Conventional solution | 93.1 | 75.63 | 93.16 | 81.19 |
| This solution (guiding image feature learning by using a text feature) | 93.5 (+0.4) | 77.72 (+1.5) | 94.12 (+0.96) | 81.72 (+0.53) |
| This solution (guiding image feature learning by using a text feature, and performing multi-class supervision by using a keyword in a text as a preset tag) | 93.1 | 78.40 (+2.7) | — | — |

Figure 12:
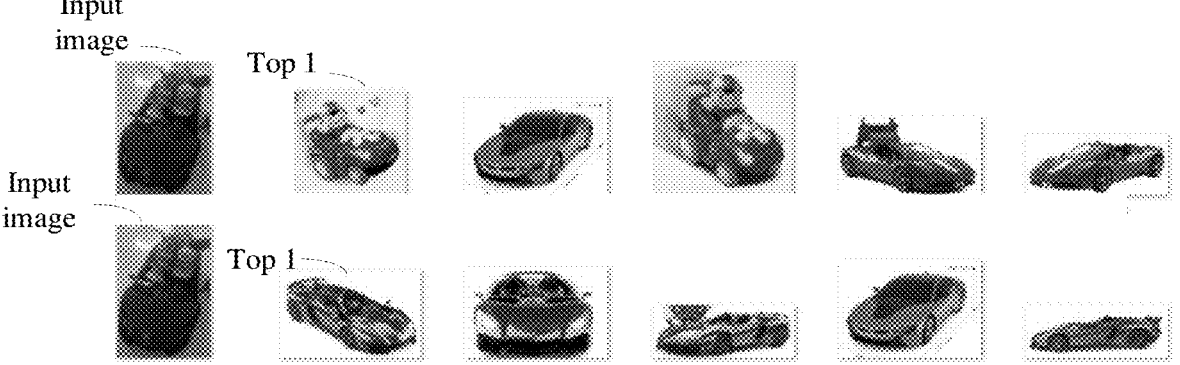
FIG. 12 is a schematic diagram of an application scenario of a solution according to an embodiment of this disclosure.

As shown in FIG. 12, after image feature learning is guided by using a text feature, model robustness for retrieval interference caused by a visual feature of an image is improved, so that a model is more adaptive to a changing photographing condition of a user. For example, a user places a doll on a to-be-retrieved toy car, and this causes great interference to retrieval. If retrieval is performed by using only an image feature, a toy car with a doll is easily retrieved. After image feature learning is guided by using a text feature, this problem is effectively alleviated.

Table 4 presents test results of performing image retrieval tasks for nine product categories by using hash features obtained by a hash model provided in this disclosure. According to the method provided in this disclosure, an image feature is compressed by 32 times (a 1024-dimen- TABLE 4-continued

| Product category | Data type | Top 1 precision test indicator | Product category | Model | Top 1 precision test indicator |
|---|---|---|---|---|---|
| Clothes | Floating point | 82.24 | | | |
| | Deep hash | 81.42 | | | |

Table 5 presents a large-scale test for shoe products according to the solution provided in this disclosure. An implementation result indicates that the solution provided in this disclosure is more advantageous than the conventional solution in terms of retrieval precision, a retrieval time, and a limitation on storage performance of an image database.

TABLE 5

| Method | Top 1 precision test indicator | (Top 1 + mAP@10)/2) | Image database size | Total duration/ retrieval times |
|---|---|---|---|---|
| This solution (performing image retrieval by using an image feature, not in an inverted-index manner) | 63.7 | 40.11 | 4.9 G | 18 min/427 |
| This solution (performing image retrieval by using a hash feature, not in an inverted-index manner) | 64.87 | 40.49 | 157M | 297 s/427 |
| Conventional solution | 51.29 | 31.87 | 363M | 143 s/427 |
| This solution (performing image retrieval by using a hash feature, in an inverted-index manner) | 63.93 | 39.79 | 167M | 100 s/427 |

Herein, mAP@10 represents precision obtained based on whether top 10 results with highest confidence in retrieval results correspond to a same commodity as a queried image. An inverted index is an indexing manner in which an inverted codebook obtained according to the solution provided in this disclosure is used.

The model training method and the image retrieval method that are provided in embodiments of this disclosure are described above. Performing an image retrieval task by using an image feature obtained according to the model training method provided in embodiments of this disclosure can effectively improve image retrieval precision and an image retrieval speed, and reduce a requirement on storage performance of an image database.

It can be understood that the model training method may be performed by using a training apparatus, and the image retrieval method may be performed by using an execution device. In this disclosure, the training apparatus is sometimes also referred to as a model training apparatus. In this disclosure, the execution device is sometimes also referred to as a terminal device, a mobile terminal, or an image retrieval device. To implement the foregoing functions, the training apparatus and the execution device include corresponding hardware structures and/or software modules for performing the functions. A person of ordinary skill in the art should be easily aware that, in combination with the examples described in the embodiments disclosed in this specification, modules and algorithm steps may be implemented by hardware or a combination of hardware and computer software in this disclosure. Whether a function is performed by hardware or by driving hardware by computer software depends on particular applications and design constraints of the technical solutions. A person skilled in the art may use different methods to implement the described functions for each particular application, but it should not be considered that the implementation goes beyond the scope of this disclosure.

Figure 13:
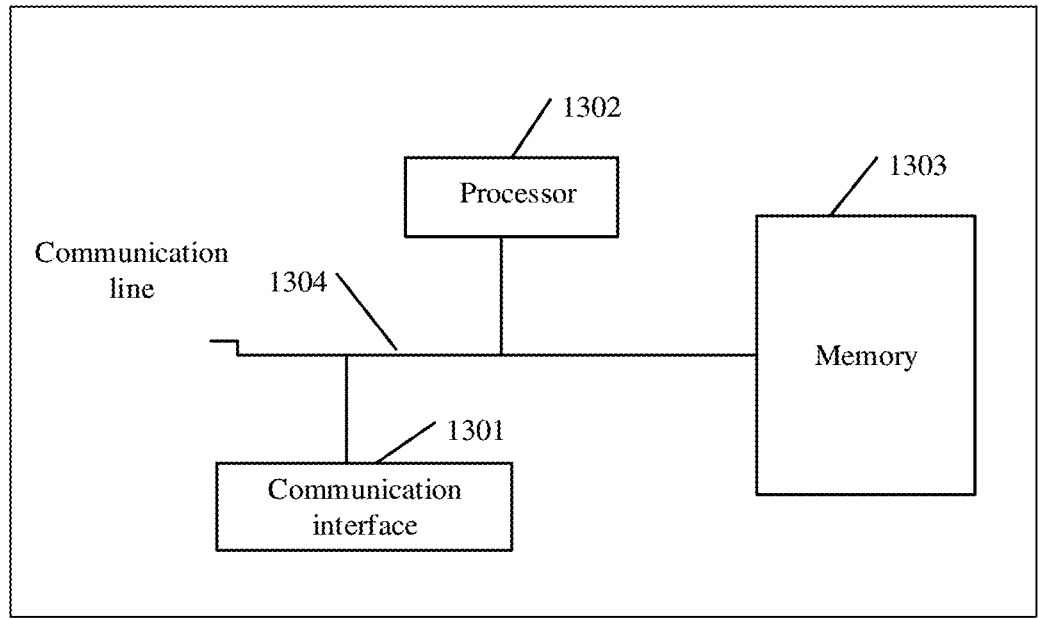
FIG. 13 is a block diagram of a training apparatus according to an embodiment of this disclosure.

For example, a training apparatus in FIG. 13 may be used for implementation. FIG. 13 is a schematic diagram of a hardware structure of a training apparatus according to an embodiment of this disclosure. The apparatus includes a communication interface 1301 and a processor 1302, and may further include a memory 1303.

The communication interface 1301 may be any apparatus of a transceiver type, and is configured to communicate with another device or a communication network, for example, an Ethernet, a radio access network (RAN), or a wireless local area network (WLAN).

The processor 1302 includes but is not limited to one or more of a central processing unit (CPU), a network processor (NP), an application-specific integrated circuit (ASIC), or a programmable logic device (PLD). The PLD may be a complex programmable logic device (CPLD), a field-programmable gate array (FPGA), generic array logic (GAL), or any combination thereof. The processor 1302 is responsible for a communication line 1304 and general processing, and may further provide various functions, including timing, peripheral interfacing, voltage regulation, power management, and another control function. The memory 1303 may be configured to store data used by the processor 1302 to perform an operation.

The memory 1303 may be but is not limited to a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM), another optical disk storage, an optical disc storage (including a compact disc, a laser disc, an optical disc, a digital versatile disc, a Blu-ray disc, and the like), a disk storage medium, another magnetic storage device, or any other medium that can be used to carry or store expected program code in a form of an instruction or a data structure and that can be accessed by a computer. The memory may exist independently, and be connected to the processor 1302 through the communication line 1304. Alternatively, the memory 1303 may be integrated with the processor 1302. If the memory 1303 and the processor 1302 are components independent of each other, the memory 1303 is connected to the processor 1302. For example, the memory 1303 and the processor 1302 may communicate with each other through the communication line. The communication interface 1301 and the processor 1302 may communicate with each other through the communication line, or the communication interface 1301 may be directly connected to the processor 1302.

The communication line 1304 may include any quantity of interconnected buses and bridges, and the communication line 1304 links various circuits including one or more processors 1302 represented by the processor 1302 and a memory represented by the memory 1303. The communication line 1304 may further link various other circuits such as a peripheral device, a voltage stabilizer, and a power management circuit. These are well known in the art, and therefore are not further described in this disclosure.

In a specific implementation, the training apparatus includes a memory and a processor. The processor obtains instructions stored in the memory, to perform the model training method described in FIG. 3 to FIG. 9. The training apparatus may further include a communication interface, to interact with another device through the communication interface, for example, obtain a training sample through the communication interface.

In this embodiment of this disclosure, the communication interface may be considered as a receiving module, a sending module, or a transceiver module, the processor may be considered as a processing module, and the memory may be considered as a storage module.

Figure 14:
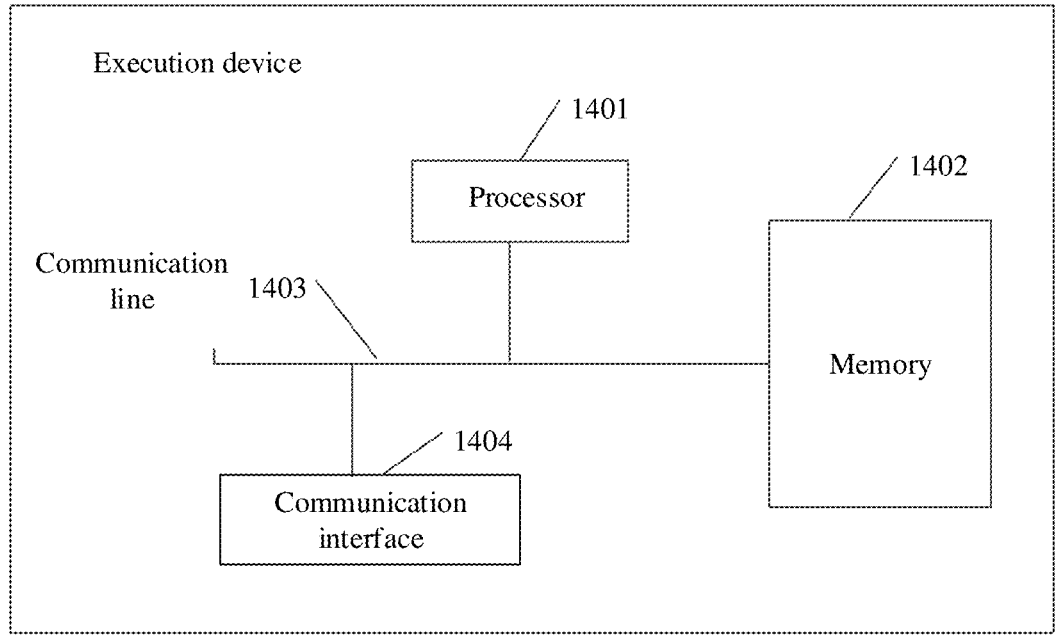
FIG. 14 is a block diagram of an execution device according to an embodiment of this disclosure.

FIG. 14 is a schematic diagram of a structure of an execution device according to an embodiment of this disclosure. As shown in FIG. 14, the execution device may include a processor 1401, a memory 1402, a communication line 1403, and a communication interface 1404. An artificial intelligence processor 1405 is connected to the memory 1402 and the communication interface 1404 through a communication bus.

The processor 1401 may be a central processing unit (CPU). Alternatively, the processor 1401 may be another general purpose processor, a digital signal processor (DSP), an application-specific integrated circuit (ASIC), a field-programmable gate array (FPGA) or another programmable logic device, a discrete gate or transistor logic device, a discrete hardware component, or the like. The processor 1401 may be a microprocessor, or the processor 1401 may be any conventional processor or the like.

Alternatively, the processor 1401 may be an integrated circuit chip having a signal processing capability. In an implementation process, the steps of the neural network processing method in this disclosure may be implemented by using an integrated logic circuit of hardware in the processor 1401 or instructions in a form of software.

The memory 1402 may be a read-only memory (ROM), a random access memory (RAM), or another memory. In this embodiment of this disclosure, the memory 1402 is configured to store data and various software programs, for example, a program for splitting a neural network model based on a determined target splitting path in embodiments of this disclosure.

Optionally, in this embodiment of this disclosure, the memory may include a physical apparatus configured to store information. Usually, the information is digitalized, and then electrically, magnetically, or optically stored by using a medium. The memory described in this implementation may further include: an apparatus storing information in an electric energy manner, such as a RAM or a ROM; an apparatus storing information in a magnetic energy manner, such as a hard disk, a floppy disk, a magnetic tape, a magnetic core memory, a magnetic bubble memory, or a USB flash drive; and an apparatus storing information in an optical manner, such as a CD or a DVD. Certainly, there are also memories using other manners, for example, a quantum memory and a graphene memory.

A transceiver apparatus, for example but not limited to a transceiver, is used for the communication interface 1404, to implement communication between the execution device and another device or a communication network. For example, a model file sent by another device may be received through the communication interface 1404.

In a specific implementation, the execution device includes a memory and a processor. The processor obtains instructions stored in the memory, to perform the image retrieval method described in FIG. 10. The training apparatus may further include a communication interface, to interact with another device through the communication interface.

In this embodiment of this disclosure, the communication interface may be considered as a receiving module, a sending module, or a transceiver module, the processor may be considered as a processing module, and the memory may be considered as a storage module.

It should be understood that the execution device is merely an example provided in this embodiment of this disclosure, and the execution device may have more or fewer components than the shown components, may combine two or more components, or may have a different component configuration implementation.

All or some of the foregoing embodiments may be implemented by using software, hardware, firmware, or any combination thereof. When software is used for implementation, all or some of the embodiments may be implemented in a form of a computer program product.

It should be understood that the foregoing is merely an example provided in embodiments of this disclosure, and the end-side device may have more or fewer components than the shown components, may combine two or more components, or may have a different component configuration implementation.

All or some of the foregoing embodiments may be implemented by using software, hardware, firmware, or any combination thereof. When software is used for implementation, all or some of the embodiments may be implemented in a form of a computer program product.

An embodiment of this disclosure further provides a chip. The chip includes a processing unit and a communication unit. The processing unit may be, for example, a processor, and the communication unit may be, for example, an input/output interface, a pin, or a circuit. The processing unit may execute computer-executable instructions stored in a storage unit, so that the chip performs the method described in FIG. 3 to FIG. 9, or so that the chip performs the method described in FIG. 10. Optionally, the storage unit is a storage unit in the chip, for example, a register or a buffer. Alternatively, the storage unit may be a storage unit that is in a wireless access device end and that is outside the chip, for example, a read-only memory (ROM), another type of static storage device that can store static information and instructions, or a random access memory (RAM). Specifically, the processing unit or the processor may be a central processing unit (CPU), a network processor (NPU), a graphics processing unit (GPU), a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or may be any conventional processor or the like.

In addition, it should be noted that the described apparatus embodiment is merely an example. The units described as separate parts may or may not be physically separate, and parts displayed as units may or may not be physical units, may be located in one position, or may be distributed on a plurality of network units. Some or all of the modules may be selected based on actual requirements, to achieve the objectives of the solutions in the embodiments. In addition, in the accompanying drawings of the apparatus embodiments provided in this disclosure, a connection relationship between modules indicates that the modules have a communication connection to each other, and the connection may be specifically implemented by one or more communication buses or signal cables.

Based on the descriptions of the foregoing implementations, a person skilled in the art may clearly understand that this disclosure may be implemented by using software in addition to necessary universal hardware, or certainly may be implemented by using dedicated hardware, including a dedicated integrated circuit, a dedicated CPU, a dedicated memory, a dedicated component, or the like. Generally, any function that can be implemented by a computer program can be easily implemented by using corresponding hardware. Moreover, a specific hardware structure used to implement a same function may be in various forms, for example, an analog circuit, a digital circuit, or a dedicated circuit. However, for this disclosure, software program implementation is a better implementation in most cases. Based on such an understanding, the technical solutions of this disclosure essentially or the part contributing to the conventional technology may be implemented in a form of a software product. The computer software product is stored in a readable storage medium, such as a floppy disk of a computer, a USB flash drive, a removable hard disk, a read-only memory (ROM), a random access memory (RAM), a magnetic disk, or an optical disc, and includes several instructions for instructing a computer device (which may be a personal computer, a server, a network device, or the like) to perform the methods described in embodiments of this disclosure.

All or some of the foregoing embodiments may be implemented by using software, hardware, firmware, or any combination thereof. When software is used for implementation, all or some of the embodiments may be implemented in a form of a computer program product.

An embodiment of this disclosure further provides a computer-readable storage medium. The computer-readable storage medium stores a program used for model training. When the program is run on a computer, the computer is enabled to perform the method described in FIG. 3 to FIG. 9, or the computer is enabled to perform the method described in FIG. 10.

An embodiment of this disclosure further provides a digital processing chip. A circuit configured to implement the foregoing processor or a processor function and one or more interfaces are integrated into the digital processing chip. When a memory is integrated into the digital processing chip, the digital processing chip may complete the method steps in any one or more of the foregoing embodiments. When no memory is integrated into the digital processing chip, the digital processing chip may be connected to an external memory through a communication interface. The digital processing chip implements, based on program code stored in the external memory, actions performed by a vehicle in the foregoing embodiments.

An embodiment of this disclosure further provides a computer program product. The computer program product includes one or more computer instructions. When the computer program instructions are loaded and executed on a computer, the procedures or functions according to embodiments of this disclosure are all or partially generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

A person of ordinary skill in the art may understand that all or some of the steps of the various methods in the foregoing embodiments may be implemented by a program instructing relevant hardware. The program may be stored in a computer-readable storage medium. The storage medium may include a ROM, a RAM, a magnetic disk, or an optical disc.

In the specification, the claims, and the accompanying drawings of this disclosure, the terms "first", "second", and the like are intended to distinguish between similar objects, but are not necessarily used to indicate a specific order or sequence. It should be understood that data termed in such a way are interchangeable in proper circumstances, so that the embodiments described herein can be implemented in other orders than the order illustrated or described herein. The term "and/or" in this disclosure describes only an association relationship between associated objects and represents that three relationships may exist. For example, A and/or B may represent the following three cases: Only A exists, both A and B exist, and only B exists. In addition, the character "/" in this specification generally indicates an "or" relationship between associated objects. Moreover, the terms "including", "having", and any other variants thereof are intended to cover a non-exclusive inclusion, for example, a process, method, system, product, or device that includes a series of steps or modules is not necessarily limited to those steps or modules that are expressly listed, but may include other steps or modules that are not expressly listed or that are inherent to such a process, method, product, or device. Names or numbers of steps in this disclosure do not mean that the steps in the method procedure need to be performed in a time/logical sequence indicated by the names or numbers. An execution sequence of the named or numbered procedure steps may be changed based on a to-be-achieved technical objective, provided that same or similar technical effects can be achieved. Division into the modules in this disclosure is logical division. In actual application, there may be another division manner. For example, a plurality of modules may be combined, or may be integrated into another system, or some features may be ignored or not performed. In addition, the displayed or discussed mutual coupling or direct coupling or communication connection may be implemented through some ports, and the indirect coupling or communication connection between modules may be in an electrical form or another similar form. This is not limited in this disclosure. In addition, modules or sub-modules described as separate components may be or may not be physically separate, may be or may not be physical modules, or may be distributed in a plurality of circuit modules. Some or all of the modules may be selected based on actual requirements, to achieve the objectives of the solutions in this disclosure.

What is claimed is:

1. A model training method comprising:

obtaining a plurality of training samples, wherein each of the plurality of training samples comprises an image and a text, and the text describes a target object in the image; and inputting the plurality of training samples into a target model, so that the target model performs a procedure until a preset stop condition is met, the procedure including:

extracting a first image feature of a first image and a text feature of a first text, wherein the first image is an image comprised in any one of the plurality of training samples, and the first text describes a first target object in the first image;

obtaining a first loss value based on a difference between a first vector and a second vector, wherein a dimension of the first vector is a same as a dimension of the second vector, the first vector indicates the first image feature of the first image, and the second vector indicates the text feature of the first text;

predicting, based on the first image feature of the first image, a first probability that the first target object in the first image belongs to each target object in an object set, wherein the object set comprises target objects comprised in all images in the plurality of training samples;

predicting, based on the text feature of the first text, a second probability that the first text describes each target object in the object set; and obtaining a third loss value based on a difference between the first probability and the second probability; and updating the target model based on the first loss value and the third loss value.

2. The method according to claim 1, wherein the method further comprises:

predicting at least one attribute of the first target object in the first image based on the first image feature of the first image; and obtaining a second loss value based on a difference between the at least one attribute and a preset tag, wherein the preset tag is obtained through word segmentation preprocessing performed on the first text; and the updating the target model based on the first loss value and the third loss value comprises:

updating the target model based on the first loss value, the second loss value, and the third loss value.

3. The method according to claim 2, wherein the method further comprises:

obtaining a fourth loss value based on a difference between the first probability and a first preset value, wherein the first preset value indicates a preset probability that the first target object in the first image belongs to each target object in the object set; and obtaining a fifth loss value based on a difference between the second probability and a second preset value, wherein the second preset value indicates a preset probability that the first text describes each target object in the object set; and the updating the target model based on the first loss value comprises:

updating the target model based on the first loss value, the second loss value, the third loss value, the fourth loss value, and the fifth loss value.

4. The method according to claim 3, wherein the method further comprises:

obtaining a sixth loss value based on a difference between the first image feature of the first image and a second image feature of a second image, wherein the second image and the first image present a same target object from different angles; and the updating the target model based on the first loss value comprises:

updating the target model based on the first loss value, the second loss value, the third loss value, the fourth loss value, the fifth loss value, and the sixth loss value.

5. The method according to claim 4, wherein the method further comprises:

obtaining a first distance between the first vector and a third vector, and obtaining a second distance between the first vector and a fourth vector, wherein the third vector indicates the second image feature of the second image, the fourth vector indicates a third image feature of a third image, and another target object comprised in the third image is different from that comprised in the first image; and obtaining a seventh loss value based on a difference between a preset threshold and a difference between the first distance and the second distance; and the updating the target model based on the first loss value comprises:

updating the target model based on the first loss value, the second loss value, the third loss value, the fourth loss value, the fifth loss value, the sixth loss value, and the seventh loss value.

6. The method according to claim 1, wherein the obtaining of the plurality of training samples comprises:

obtaining a first target image of a product, a text title of the product, and a second target image of the product, wherein the first target image is received from a first source, and the second target image is received from a second source different from the first source;

using the first target image as an input of a segmentation model to obtain a segmentation result, wherein the segmentation result indicates a contour of the product in the first target image;

extracting a target area of a third target image based on the segmentation result, wherein the third target image is obtained by inputting the first target image into a generator, and an image received from the first source and the image received from the second source are used for a training process of the generator;

performing random affine transformation on the target area to obtain a transformed target area;

combining the transformed target area and a preset background to obtain a fourth target image; and obtaining a first-type training sample, a second-type training sample, and a third-type training sample, wherein the first-type training sample comprises the first target image and the text title, the second-type training sample comprises the second target image and the text title, and the third-type training sample comprises the fourth target image and the text title.

7. The method according to claim 6, wherein the first source is a provider of the product and the second source is a buyer of the product.

8. An image retrieval method comprising:

obtaining a to-be-retrieved image;

extracting an image feature of the to-be-retrieved image by using a target model; and obtaining a predicted image from an image database based on the image feature of the to-be-retrieved image, wherein a similarity between an image feature of the predicted image and the image feature of the to-be-retrieved image reaches a threshold, wherein the target model is a model obtained by training an initial target model based on the model training method according to claim 1.

9. A model training apparatus comprising:

a memory, configured to store computer-readable instructions; and a processor coupled to the memory, configured to execute the computer-readable instructions in the memory, so as to perform the method according to claim 1.

10. An image retrieval method comprising:

obtaining a to-be-retrieved image;

extracting an image feature of the to-be-retrieved image by using a target model; and obtaining a predicted image from an image database based on the image feature of the to-be-retrieved image, wherein a similarity between an image feature of the predicted image and the image feature of the to-be-retrieved image reaches a threshold, wherein the target model is a model obtained by updating an initial target model based on a first loss value, the first loss value is obtained based on a difference between a first vector and a second vector, a dimension of the first vector is a same as a dimension of the second vector, the first vector indicates a first image feature of a first image, the second vector indicates a text feature of a first text, the first image is an image comprised in any one of a plurality of training samples, the first text describes a first target object in the first image, each of the plurality of training samples comprises an image and a text, and the text describes a target object in the image;

wherein the target model is a model obtained by updating the initial target model based on the first loss value and a second loss value, the second loss value is obtained based on a difference between at least one attribute and a preset tag, and the at least one attribute is at least one attribute that is of the first target object in the first image and that is predicted based on the first image feature of the first image; and wherein the target model is obtained by updating the initial target model based on the first loss value, the second loss value, and a third loss value, the third loss value is obtained based on a difference between a first probability and a second probability, the first probability is predicted based on the first image feature of the first image and is a probability that the first target object in the first image belongs to each target object in an object set, and the second probability is predicted based on the text feature of the first text and is a probability that the first text describes each target object in the object set.

11. A non-transitory computer-readable medium comprising a program, wherein when the program is executed by a processing system including at least one computer processor, the method according to claim 1 is performed.

12. A model training method comprising:

obtaining a plurality of training samples, wherein each of the plurality of training samples comprises an image and a text, and the text describes a target object in the image; and inputting the plurality of training samples into a target model, so that the target model performs a procedure until a preset stop condition is met, the procedure including:

extracting a first image feature of a first image and a text feature of a first text, wherein the first image is an image comprised in any one of the plurality of training samples, and the first text describes a first target object in the first image;

obtaining a first loss value based on a difference between a first vector and a second vector, wherein a dimension of the first vector is a same as a dimension of the second vector, the first vector indicates the first image feature of the first image, and the second vector indicates the text feature of the first text; and updating the target model based on the first loss value;

wherein the method further comprises:

performing a of times of training on a hash model based on a plurality of image features extracted by the target model, to obtain a trained hash model, wherein any one of the plurality of times of training comprises:

obtaining a hash feature corresponding to each of the plurality of image features;

performing clustering processing on a plurality of hash features, to obtain a plurality of clustered datasets;

obtaining a first hash feature from the plurality of hash features, wherein the first hash feature is any one of the plurality of hash features;

obtaining a first clustered dataset from the plurality of clustered datasets based on a similarity between a cluster center of each of the plurality clustered datasets and the first hash feature, wherein a similarity between a cluster center of the first clustered dataset and the first hash feature is the highest in the plurality of clustered datasets;

obtaining another loss value based at least on a difference between the cluster center of the first clustered dataset and the first hash feature; and updating the hash model based on the another loss value.

13. The method according to claim 12, wherein the updating the target model based on the first loss value comprises:

updating the target model based at least on the first loss value and the another loss value.

14. The method according to claim 12, wherein any one of the plurality of times of training further comprises:

applying a first constraint and a second constraint to a target hash feature, to obtain an updated target hash feature, wherein the target hash feature is a hash feature obtained based on a last updated hash model, the first constraint is that quantities of preset values and other preset values in the hash feature are average, the second constraint is that an element on a first diagonal of a target matrix is the preset value and an element other than the first diagonal in the target matrix is the other preset value, an element in the $i^{th}$ row and the $j^{th}$ column in the target matrix represents an average value of a plurality of target elements, the plurality of target elements represent products of values of the $i^{th}$ dimension of the hash features and values of the $j^{th}$ dimension of the hash features, and i and j are positive integers;

comparing a value of each dimension of the target hash feature and a second mean, wherein the second mean is an average value of the preset value and the other preset value; and based on a determination in the comparing that the value of each dimension is less than the second mean, obtaining an additional loss value based on a difference between the value of each dimension of the hash feature and the preset value; or based on a determination in the comparing that the value of each dimension is not less than the second mean, obtaining the additional loss value based on a difference between the value of each dimension of the hash feature and the other preset value; and the updating the hash model based on the another loss value comprises:

updating the hash model based on the another loss value and the additional loss value.

15. An image retrieval device comprising:

a memory, configured to store computer-readable instructions; and a processor coupled to the memory, configured to execute the computer-readable instructions in the memory, so as to perform the method according to claim 10.

16. The method according to claim 10, wherein the target model is a model obtained by updating the initial target model based on the first loss value, the second loss value, the third loss value, a fourth loss value, and a fifth loss value, the fourth loss value is obtained based on a difference between the first probability and a first preset value, the first preset value indicates a preset probability that the first target object in the first image belongs to each target object in the object set, the fifth loss value is obtained based on a difference between the second probability and a second preset value, and the second preset value indicates a preset probability that the first text describes each target object in the object set.

17. The method according to claim 16, wherein the target model is obtained by updating the initial target model based on the first loss value, the second loss value, the third loss value, the fourth loss value, the fifth loss value, and a sixth loss value, the sixth loss value is obtained based on a difference between the first image feature of the first image and a second image feature of a second image, and the second image and the first image present a same target object from different angles.

18. The method according to claim 17, wherein the target model is obtained by updating the initial target model based on the first loss value, the second loss value, the third loss value, the fourth loss value, the fifth loss value, the sixth loss value, and a seventh loss value, the seventh loss value is obtained based on a difference between a preset threshold and a difference between a first distance and a second distance, the first distance is a distance between the first vector and a third vector, the second distance is a distance between the first vector and a fourth vector, the third vector indicates the second image feature of the second image, the fourth vector indicates a third image feature of a third image, and another target object comprised in the third image is different from the first target object comprised in the first image.

19. A non-transitory computer-readable medium comprising a program, wherein when the program is executed by a processing system including at least one computer processor, the method according to claim 10 is performed.

* * * * *